US006275141B1

(12) United States Patent
Walter

(10) Patent No.: US 6,275,141 B1
(45) Date of Patent: *Aug. 14, 2001

(54) SINGLE-KEY SECURITY SYSTEM

(76) Inventor: Gerhard Walter, 29 Forbus St., Apt. 12, Poughkeepsie, NY (US) 12601

( * ) Notice: Subject to any disclaimer, the term of this patent is extended or adjusted under 35 U.S.C. 154(b) by 0 days.

This patent is subject to a terminal disclaimer.

(21) Appl. No.: 09/351,128

(22) Filed: Jul. 12, 1999

Related U.S. Application Data

(63) Continuation-in-part of application No. 09/075,340, filed on May 11, 1998, now Pat. No. 5,959,540, which is a continuation of application No. PCT/US99/07032, filed on May 10, 1999.

(51) Int. Cl.[7] .......................................................... G06F 7/04
(52) U.S. Cl. .................. 340/5.64; 340/5.72; 340/825.69; 341/176; 180/287; 307/10.4
(58) Field of Search .......................... 340/825.31, 825.69, 340/825.72, 426, 455, 5.64, 5.72; 341/176; 180/287; 307/10.2, 10.3, 10.4, 10.5, 10.7; 70/256, 257, 456; 701/49, 48; 704/273

(56) References Cited

U.S. PATENT DOCUMENTS

| | | | |
|---|---|---|---|
| 4,638,293 | 1/1987 | Min | 340/426 |
| 4,754,255 * | 6/1988 | Sanders | 340/426 |
| 4,945,741 * | 8/1990 | Brewer | 70/456 R |
| 5,177,989 * | 1/1993 | Stillwagon | 70/456 R |
| 5,467,070 * | 11/1995 | Drori | 340/426 |
| 5,479,156 * | 12/1995 | Jones | 340/825.31 |
| 5,513,107 | 4/1996 | Gormley | 701/48 |
| 5,561,331 | 10/1996 | Suyama et al. | 307/103 |
| 5,563,576 | 10/1996 | Drori et al. | 340/455 |
| 5,774,858 * | 6/1998 | Taubkin | 704/273 |

* cited by examiner

*Primary Examiner*—Edwin C. Holloway, III
(74) *Attorney, Agent, or Firm*—Pillsbury Winthrop LLP

(57) ABSTRACT

A system for restricting access to certain components of a vehicle, the vehicle having a first mode wherein access to the certain components is restricted and a second mode wherein the certain components are accessible, the vehicle having a processor programmed to place the vehicle in the first mode upon receipt of a first signal and to place the vehicle in the second mode upon receipt of a second signal, the system comprising: a remote control; and means for causing transmission to the processor of the first signal to place the system in the first mode and means for causing transmission of the second signal to the processor to place the system in the second mode. Various embodiments are disclosed.

26 Claims, 17 Drawing Sheets

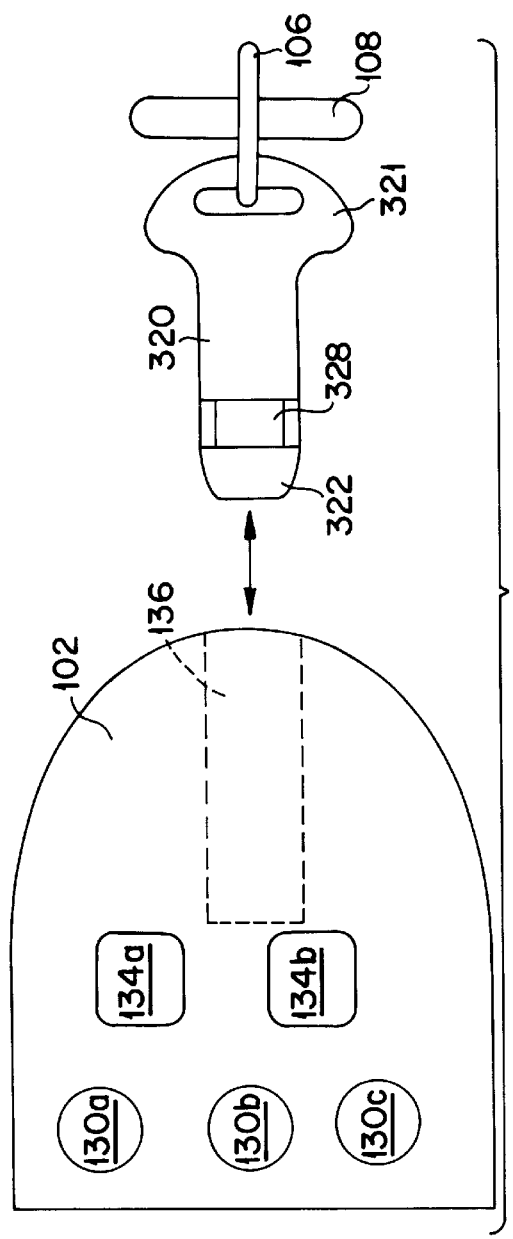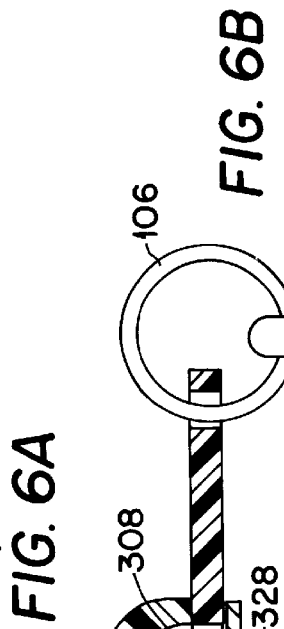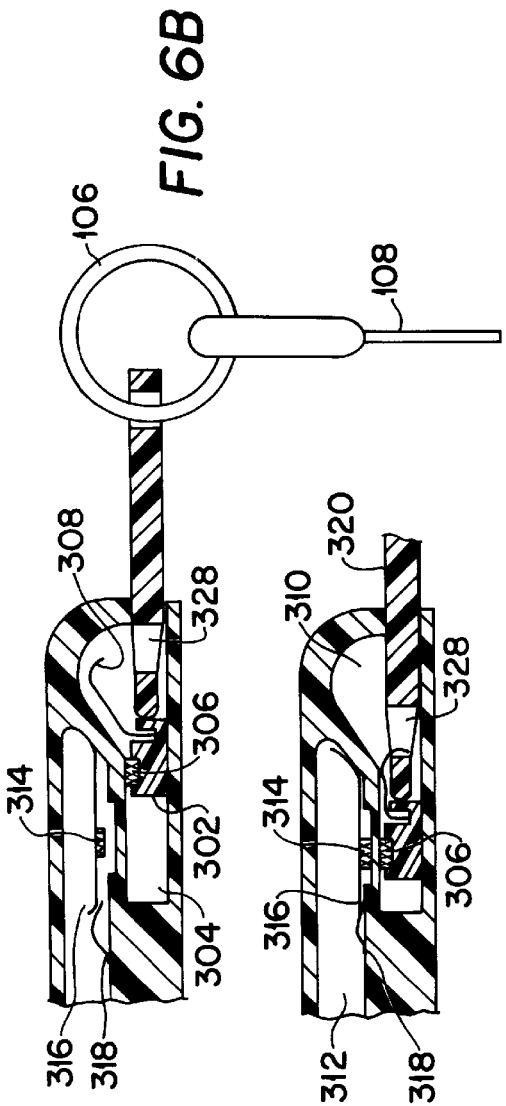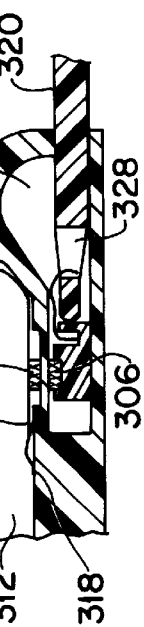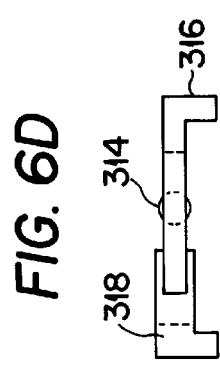

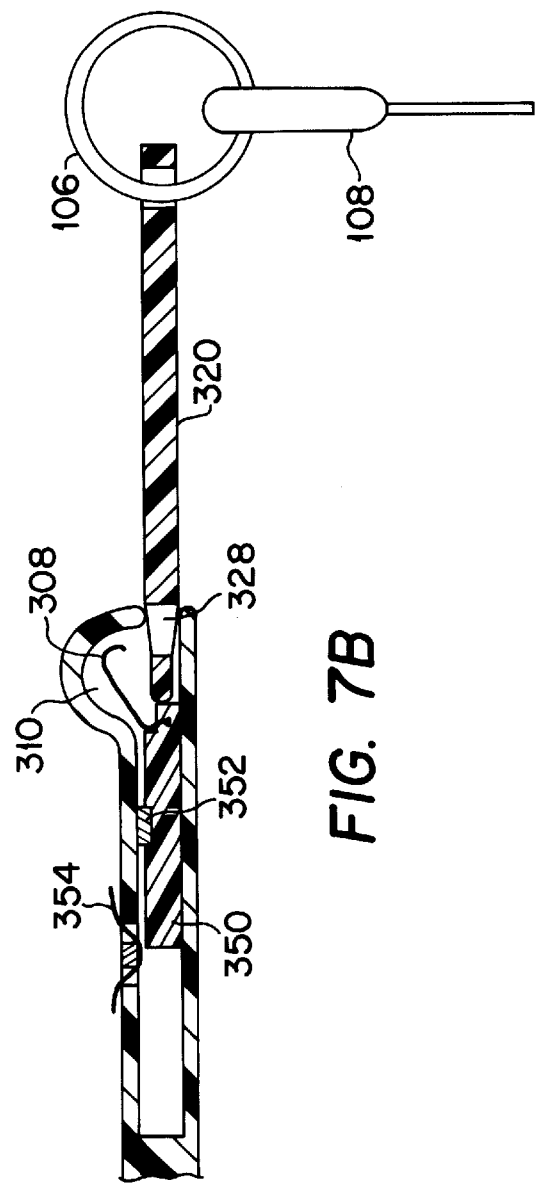
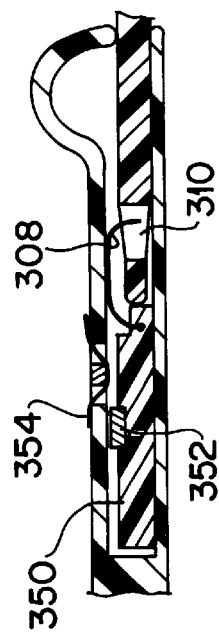
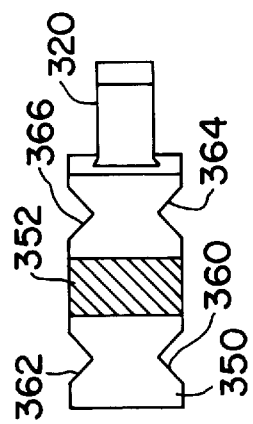
FIG. 7B
FIG. 7C
FIG. 7D

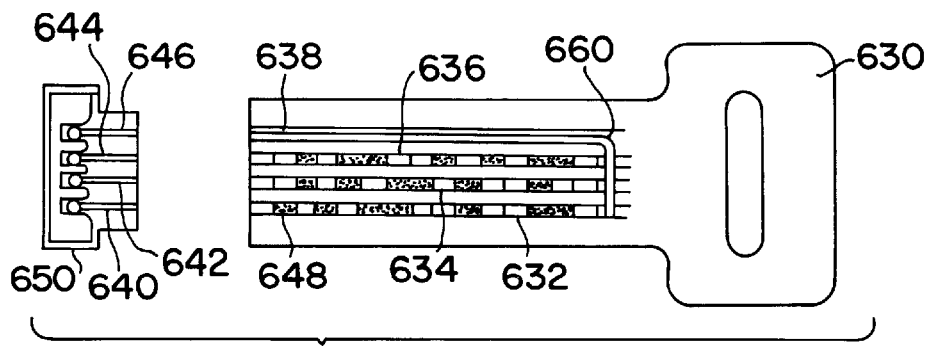
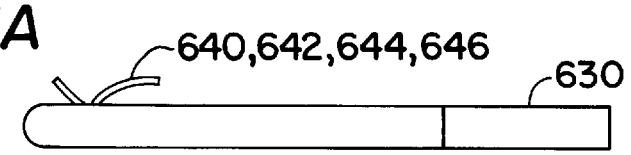
FIG. 15A
FIG. 15B
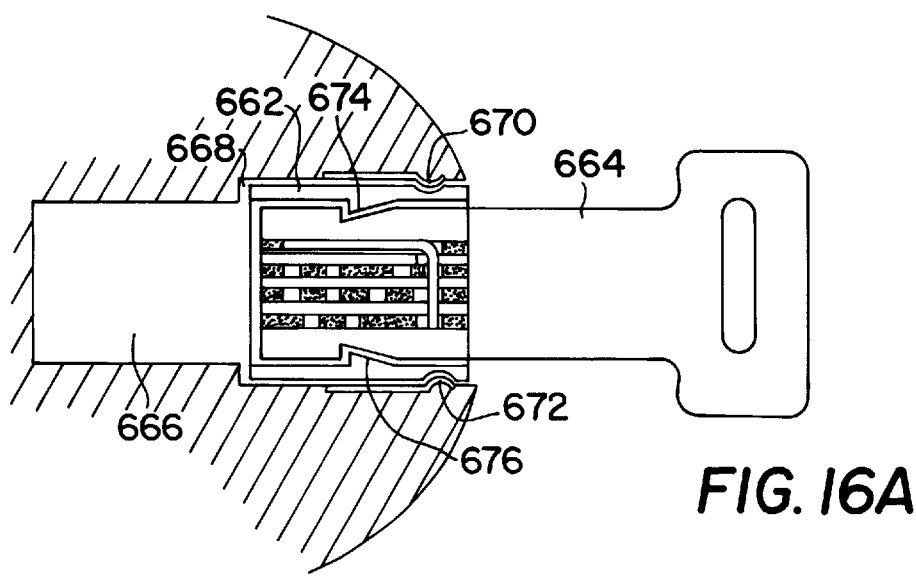
FIG. 16A
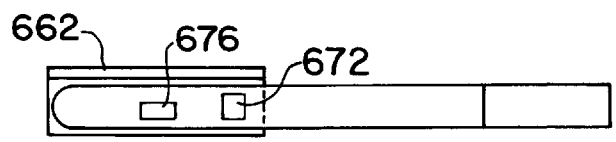
FIG. 16B

SINGLE-KEY SECURITY SYSTEM

RELATED ART

This application is a continuation-in-part of U.S. patent application Ser. No. 09/075,340, filed May 11, 1998, now U.S. Pat. No. 5,959,540 which is incorporated herein by reference which is a continuation of application PCT/US99/07032 filed May 10, 1999.

FIELD OF THE INVENTION

This invention relates to security systems for vehicles, and more particularly, to devices for limiting and controlling access to certain components of a vehicle. The invention differs from security systems which provide vehicle alarm or theft deterrent or prevention systems. However, the invention also contemplates the coordination of the security system of the invention with various types of known security systems which are currently being used.

BACKGROUND OF THE INVENTION

In many instances it is desirable or necessary to provide limited and restricted access to certain components of a vehicle such as a motor vehicle. For example, when having a motor vehicle parked in a parking lot or parking garage, it is necessary to give an attendant or valet control over the vehicle's ignition key so that the vehicle can be moved as necessary. The same is true, for example, at a car wash or car repair shop, where the key is left in the ignition, frequently with the engine running but, in any case, in a way such that control over the key is given to an attendant.

While giving up control over the ignition key is necessary in such cases, it is, at the same time, desirable to prevent access by the attendant to certain areas of the vehicle, for example, the trunk or glove compartment, where valuables may be stored. Accordingly, many vehicles are provided with two keys, one of which (the master key) operates the ignition system of the vehicle as well as all other locks (for example, the vehicle doors, trunk, glove compartment, fuel door) while the other key (the valet key) functions only for the ignition system and the vehicle doors. This provides some degree of security although there are problems with the two-key system, as discussed below.

Some vehicles allow the trunk and fuel door to be opened from within the vehicle, for example, by pulling a lever or pressing a button. If one has neglected to block access by individually locking the trunk, fuel door, etc., with the master key, unwanted access to such vehicle areas by an attendant or by a criminal who has broken into the vehicle interior, is not precluded.

In some expensive motor vehicles, all external mechanically operable locks, except the driver's door lock, have been eliminated, and, in certain models, even the driver's door lock and ignition lock have been eliminated. This deters access by thieves who pick locks or simply remove them. The trunk and the fuel door have electric locks controlled by buttons on the dashboard and further buttons on a remote control. To disable access to the trunk, glove compartment, etc., an internal button must be pressed in order to change to a Restricted Access Valet Mode. One example of this approach is the 1998 Cadillac Eldorado, which has a Restricted Access Valet Mode activated by a button in the glove compartment. Once the button is pressed, the glove compartment is locked automatically when closed. Unlocking the glove compartment requires a second key. In such a vehicle, the ignition or master key does not open the glove compartment and, therefore, can be given to a valet or attendant.

After having eliminated as many mechanical locks as possible to increase security, this system is dependent on a mechanical lock, the glove compartment lock, to bar access to the mode change button, a security weakness.

While useful, the two-key systems present a number of problems. At a minimum, they require two keys to be carried and separated whenever a valet or like service is used. If the wrong key is mistakenly given to a valet or the Restricted Access Mode not invoked, as can easily happen, security is lost. Furthermore, the two-key systems require a vehicle to be divided into two fixed zones, one of which is not accessible with one of the keys, without the flexibility to change the zone extent.

Some vehicles are provided with only a single key for all functions so that there is no way to deny access to the trunk, glove compartment, etc., by an attendant or a criminal who has broken into the vehicle.

Many motor vehicles today are equipped with a Vehicle Attack Alarm/Vehicle Theft Prevention (VAA/VTP) security system to deter criminals from gaining access to the interior and to prevent vehicle theft. These VAA/VTP security systems typically sense shocks or changes in electric current flow, when, for example, a door is being opened, and, when triggered, the system disables the starter and sets off an alarm.

VAA/VTP security systems can have passive and active modes of operation, which can be chosen by the vehicle owner, or can be set by the security system manufacturer. In the passive mode, a VAA/VTP system is armed automatically when, for instance, a specific time interval has elapsed after the ignition key has been pulled out of the ignition lock, the driver's door has been opened and all doors have been closed.

When a motor vehicle is in the active security mode, the VAA/VTP system is armed by the driver, for instance, by pressing a button on a remote control. Some vehicles in the active security mode can be armed by pressing the LOCK DOOR button on the vehicle's general remote control once or twice.

In most VAA/VTP systems, active and passive, pressing the OPEN DOOR button on the vehicle's general remote control causes the system to disarm.

Whenever a motor vehicle is turned over to a valet for parking, or to a car repair shop or car wash for service, the automatic arming of a passive VAA/VTP security system must be prevented. Most VAA/VTP systems allow the passive mode to be disabled by placing the system into a conventional Valet Mode (distinct from the Restricted Access Valet Mode of the invention). The system may be placed in the conventional Valet Mode using a dedicated, hard-to-find interior button, or by pressing one or more buttons on the vehicle's remote control in an unusual way, e.g. by pressing the UNLOCK DOOR button for a long, non-normal time. Automatic arming may be restored, once the car is returned, by a similar button pressing operation.

A passive VAA/VTP security system used in conjunction with an access restriction system complicates the security steps a driver must take when leaving the motor vehicle and has greater scope for errors.

SUMMARY OF THE INVENTION

As will be evident, there are numerous problems associated with currently available security systems for motor vehicles. The present invention overcomes these and other problems by providing, in one embodiment, a single-key security system which operates automatically, conveniently and in a fail-safe manner thus providing a vehicle access control system which does not require separate keys and which is not limited to two fixed zones.

Accordingly, in its broadest aspects, the invention provides a system for restricting access to certain components or areas of a vehicle, the vehicle having a Restricted Access Valet Mode wherein access to selected components of the vehicle is restricted and a Normal Mode wherein these components are accessible, the vehicle having a processor programmed to place the vehicle in the Restricted Access Valet Mode upon receipt of a first signal and to place the vehicle in the Normal Mode upon receipt of a second signal. The system includes a remote control and a mechanism for causing the remote control to generate signals sent to the processor. This mechanism can include a connector, removably connected to the remote control. The remote control can generate an appropriate signal when the connector is removed and when it is reconnected. Alternatively, the connector can be eliminated by providing the remote control with a suitable slot or other means for insertion or removal of, for example, a key, key ring, or system specific ID Tag to transmit the appropriate signal.

Stated somewhat differently, the invention provides a device for controlling access to selected areas or components of a vehicle, the vehicle having a Restricted Access Valet Mode wherein these areas or components of the vehicle are inoperable and a Normal Mode wherein these areas or components are operable, the vehicle comprising a programmed processor, a remote control and a mechanism for causing the remote control to generate signals sent to the processor, all as described herein.

The invention also provides a method of controlling access to certain components of a vehicle using a device as described above comprising a processor, a remote control and a mechanism for causing the remote control to generate signals sent to the processor so as to place the vehicle in the Restricted Access Valet Mode or the Normal Mode as desired.

As will be appreciated, the remote control causes the transmission of the first signal when the connector, key, key ring, or ID Tag, is disconnected from the remote control. The remote control also causes transmission of the second signal when the connector, key, key ring, or ID Tag is reconnected to the remote control. The method includes disconnecting the connector, key, key ring, or ID Tag from the remote control, whereby the first signal is transmitted to the vehicle and the vehicle is placed in the Restricted Access Valet Mode. In a preferred embodiment, the method also includes reconnecting the connector, key, key ring or ID Tag to the remote control, whereby the second signal is transmitted to the vehicle and the vehicle is placed in the Normal Mode.

In a modification of the invention, the remote control itself is designed so that it can be physically separated into two parts, a Key Remote Control and a Driver Remote Control. The remote control can generate a signal when its two parts are disconnected and can generate a second signal when its two parts are reconnected.

An additional, convenience feature of this invention is the ability to integrate the single-key security system described herein with vehicle alarm/theft prevention security systems, such as VAA/VTP systems. In addition, the overall system can be programmed so that when self-parking the vehicle, the driver can choose to activate or arm the VAA/VTP system when the single-key security system is placed in the Restricted Access Valet Mode so as to provide an Extra Security Mode.

In another modification, the remote control can be replaced by, or used with, the radio of the vehicle. In this embodiment, the radio of the motor vehicle is modified to include a state which allows the driver to send a signal to the processor to place the vehicle in the Restricted Access Valet Mode or the Normal Mode, or only in the Normal Mode, with the remote control placing the system in the Restricted Access Valet Mode. The Restricted Access Valet Mode can be deactivated by the entry into the radio of a secret number.

In a further modification, the system or method can be operated on the basis of voice or speaker recognition, the vehicle having a Restricted Access Valet Mode wherein the controlling device comprises voice-to-electrical signal conversion and a processor generating a signal upon determining a match of the received signal with an expected received signal, causing return of the vehicle to the Normal Mode.

As will be appreciated, the various modifications of the invention provide numerous advantages over existing security systems. For instance, for single-key vehicles, the invention offers a level of protection previously unavailable. Further, the invention offers the advantages of simplicity while at the same time making it unlikely that a driver will forget to put the car in the Restricted Access Valet Mode. Thus, for example, the simple act of separating the connector, key ring, key or ID Tag from the remote control can be used to automatically place the vehicle in its Restricted Access Valet Mode, the Normal Mode being readily restored when the connector, key, key ring or ID Tag is reattached to the remote control.

The single-key security system also offers a solution, or at least part of a solution, to a serious problem: small children left in a stationary motor vehicle climb into the trunk, perhaps after having opened it by pushing an "Open Trunk" button on the vehicle's dashboard, then close the trunk from the inside, becoming entrapped with possibly fatal consequences. In the summer of 1998, eleven children in three separate incidents died from the heat after entrapping themselves in a motor vehicle trunk. (See New York Times, Friday, Feb. 26, 1999, Page F1, "Keeping Children Out of Danger"). To deal with this problem, a national panel of experts is exploring a range of solutions. The National Highway Administration is to issue a standard addressing the problem. General Motors has developed a dealer installable kit as an interim measure consisting of a trunk lid release mechanism inside the trunk with a large, yellow handle mounted near the trunk's entry/exit and illuminated for half an hour after trunk closure. This is a desirable feature, but it is not sufficient since small children in a state of panic may not recognize the function of the yellow handle. A preferable approach is to make it impossible for small children to get into the trunk in the first place. This is easily done with the present Single-Key Security System, by putting it in the Restricted Access Valet Mode.

BRIEF DESCRIPTION OF THE DRAWINGS

The above and other objectives and advantages of the invention will be apparent upon consideration of the following detailed description, taken in conjunction with the accompanying drawings, in which the reference numbers, where feasible, refer to like parts throughout and in which:

FIGS. 3, 4, 5A, 5B, 6A–E AND 7A–7D depict various embodiments of the remote control/connector switching mechanism according to the present invention;

FIGS. 14, 15A, 15B, 16A, 16B, 17A–C, 18, 19A AND 19B depict various integrated key/remote control ID Tags and receptors according to the present invention.

DETAILED DESCRIPTION OF PREFERRED EMBODIMENTS

A. Interaction Of The Remote Control With The Vehicle's Processing Unit.

Figure 1:
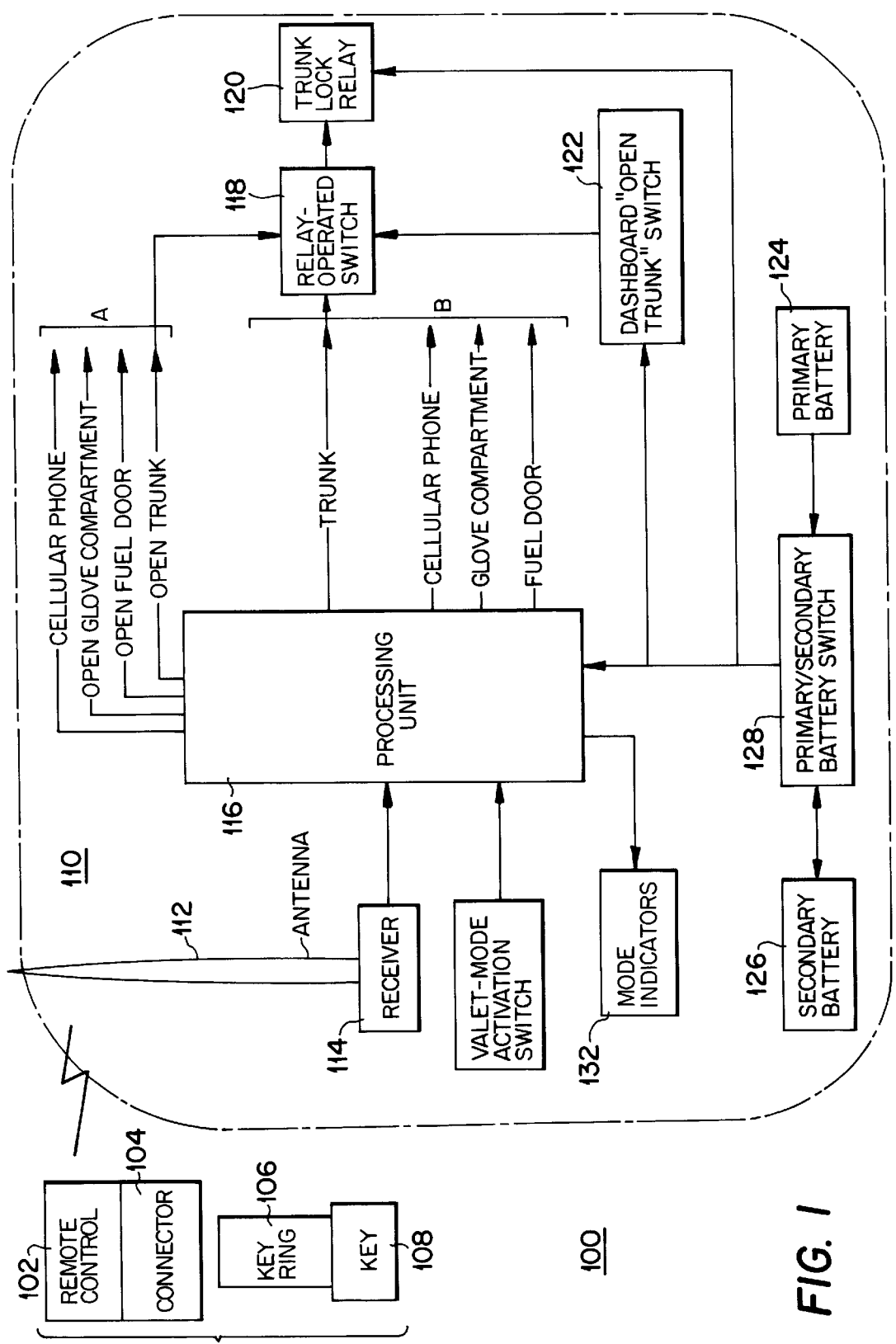
FIG. 1 is a schematic depiction of the single-key security system operating with a motor vehicle.

FIG. 1 schematically depicts one embodiment of the single-key security system 100 of the present invention. In FIG. 1, the remote control 102 is removably connected to connector 104 which is itself connected to a key ring 106 with key 108 thereon. The invention includes several alternative embodiments which vary the design of the remote control. For instance, the connector 104 may be eliminated and remote control 102 can be connected directly to either key ring 106 or key 108. Still other embodiments of the present invention provide that the remote control generates a signal when a specific code is entered into it or when a system specific ID Tag is read by the remote control. The schematic of FIG. 1, however, generally represents the concept of the present invention's interaction of the remote control with the processing unit in the motor vehicle.

As shown in FIG. 1, a vehicle 110 is provided with an antenna 112 connected to a receiver 114. The antenna 112 can be the vehicle's AM/FM radio antenna, a cellular telephone antenna or a separate antenna specifically for use with the system 100. The receiver 114 receives radio frequency signals from the remote control (via the antenna 112) and provides signals to a processing unit 116. The key 108 on the key ring 106 is the only key of the vehicle 110.

In the descriptions that follow, a processor and transmitter are located in the remote control. However, it will be appreciated that this processor and transmitter may be positioned elsewhere.

Preferably the remote control 102, the receiver 114 and the antenna 112 are the same as the ones used to control other functions and features of the vehicle 110 which are typically provided by the vehicle manufacturer or with the vehicle's security system. It is, for example, desirable not to have to use more than one remote control for a vehicle.

The receiver 114 and the processing unit 116 can be integrated into the same device or they can be separate devices. The processing unit 116 is programmed to switch the vehicle 110 into various modes, depending on the signal from the receiver 114 and possibly depending on the current state of the vehicle 110.

The processing unit 116 produces two kinds of output. For the sake of this description, the outputs are distinguished as those coming out of the top of the processing unit 116 in FIG. 1 (designated "A"), and those coming out of the right-hand side of the processing unit in FIG. 1 (designated "B"). Functionally, the two kinds of output differ as follows:

The "A" output signals (shown in FIG. 1 coming out of the top of the processing unit 116) are used to control various devices and parts of the vehicle as shown. For example, the "A" output signal designated "Open Glove Compartment" allows the glove compartment to be opened and the "Open Trunk" signal allows the vehicle's trunk to be opened. These "A" output signals are sent by the processing unit 116 in response to either buttons being depressed on the remote control 102 or, in some cases, depression of buttons or switches in the vehicle itself.

The "B" output signals (shown coming out of the right side of the processing unit 116 in FIG. 1) are current path cutting and restoring output signals. For example, the "B" output signal designated "Trunk" cuts or restores power to the trunk relay-operated switch 118. When the power to the trunk relay-operated switch 118 is cut, the trunk lock relay becomes inoperable and the trunk cannot be opened, unlocked (or locked) using the dashboard "Open Trunk" switch 122 or an "Open Trunk" ("A") signal sent from the processor 116.

The operation of these signals is described in detail with reference to the vehicle's trunk. Analogous operations for the cellular phone, glove compartment, fuel door and other vehicle components are contemplated but need not be described.

The relay-operated switch 118 is positioned between the processing unit 116 and a trunk lock relay 120. The "Open Trunk" switch 122 is located on the vehicle's dashboard or in some other convenient location. The switch 122 is connected to the relay-operated switch 118. The relay-operated switch 118 is also provided with an "A" output signal from the processing unit 116.

In order to limit current drain on the system (except during the short time when the security state is changed), when the trunk is to have its current path cut or restored, the system sends an electrical pulse to the relay-operated switch 118, which is a Push On-Push Off Switch.

When the trunk relay-operated switch 118 is in an "On" position, it allows current to flow to the trunk lock relay coil 120, and when the switch 118 is in an "Off" position, it cuts the current path to the trunk lock relay coil 120. If the switch 118 is in the "Off" position, a current pulse received from, for example, the dashboard "Open Trunk" switch 122 will not go through the switch 118 to the trunk lock relay 120 (that is, the system is in the Restricted Access Valet Mode). Alternatively, if the switch 118 is in an "On" position, a current pulse from an "A" "Open Trunk" signal or from the dashboard "Open Trunk" switch will go to the trunk lock relay 120, closing the normally open contact points and allowing power to pass to a trunk lid release magnet.

The portion of system 100 that is in the vehicle 110 is powered by a primary battery 124, which is preferably the vehicle's battery. A secondary battery 126 provides backup power in case of failure of the primary battery 124. A battery switch 128 automatically switches the power circuits from the primary battery 124 to the secondary battery 126 when the voltage of the primary battery 124 drops below a predetermined value. The system prevents current from flowing from the secondary battery 126 to the primary battery 124. Preferably some indication of power failure and battery switch-over is provided. The system can be provided with a manual switch-over to the secondary battery 126 if the automatic switch fails or is not provided. Preferably the secondary battery 126 is rechargeable and is kept charged by the normal operation of the vehicle 110.

The secondary battery 126 need only supply enough power to operate the security system 100 a few times, perhaps only once, since the vehicle 110 is itself not operable and one would either want to take one's belongings out of the vehicle by setting the system state to the Normal Mode or to lock them safely in the vehicle by setting the state to the Restricted Access Valet Mode, called the Extra Security Mode when no valet is involved. If the vehicle supplies power to equipment used in an emergency like a cellular phone that could be required to be operational for an appreciable length of time, a more powerful secondary battery would be installed. Also, the high/low-power-consumption radio (described below) would be usable in an emergency situation.

In the embodiment shown in FIG. 1, the remote control 102 transmits a signal, preferably an electromagnetic signal such as a radio frequency signal, when it is separated from the connector 104. The remote control 102 also transmits a signal when it is reconnected to the connector.

In the connector-less embodiments of the present invention, the remote control transmits a signal when it is separated from the key 108 or the key ring 106. A signal is also transmitted by the remote control when the key 108 or key ring 106 is joined to the remote control. In ID-Tag embodiments of the present invention, the remote control 102 transmits a signal when the ID tag is removed from the remote control and when the ID Tag is inserted into the remote control and the information stored in the ID Tag is read.

In some embodiments the signals transmitted from the remote control are of one type, e.g. radio frequency. In other embodiments, the remote control is capable of sending more than one type of signal, e.g. an infrared signal to open doors, and a radio frequency signal to, from a distance, open the sunroof, flash lights, etc.

Radio signals transmitted by the remote control go to the processing unit 116 via antenna 112 and receiver 114. Non-radio frequency signals are conveyed to the processor in an analogous manner.

In preferred embodiments, the signal transmitted by the remote control 102 is used by the processing unit 116 to activate or deactivate a Restricted Access Vale Mode of the vehicle 110. In this mode, control of and access to various parts of the vehicle 110, (including but not limited to its glove compartment, trunk, cellular phone and fuel door) may be denied. In order to control access to these parts of the vehicle 110, the processing unit 116 sends signals ("B" signals in FIG. 1) for disabling the opening mechanisms for each of those devices by cutting the current path to each respective device.

The particular definition of "Restricted Access Valet Mode" is vehicle specific. In this mode, some parts of the vehicle may be locked, regardless of their state prior to entering the mode. Other parts of the vehicle may be left in their prior state (locked or not) when the Restricted Access Valet Mode is entered. The trunk and fuel door, for example, are normally locked and are opened either by pushing a button on the dashboard or on the remote control.

In some vehicles, e.g., the Cadillac Catera, the processor ignores commands from the trunk opening buttons on the dashboard and the remote control while the vehicle is in gear. For these vehicles, the cost of incorporating the Single-Key Security System would be reduced, assuming the provisions for in-gear disablement of the trunk opening system are tamper-proof.

By way of example, the locking mechanism for the trunk is shown in FIG. 1. The other locking mechanisms operate in a similar manner (that is, for the glove compartment, fuel door and other mechanical devices). The locking of electrical systems and devices such as the cellular phone, if powered by the motor vehicle, is performed by comparable electrical switching.

To prevent by-passing of the security system, the signal lines from the processing unit 116 to the various devices are made as inaccessible as possible.

To further prevent by-passing of the security system by using a signal generator or remote control other than the one assigned to the motor vehicle, the signals caused to be transmitted by the remote control 102 are specific to that remote control/vehicle pair. In some embodiments the processing unit 116 and remote control 102 can select automatically changing communication security codes, for example, as presently done with some portable telephones. Someone using a scanner to pick up the transmitted signal will then not be able to access the vehicle.

When self-parking the vehicle, the driver can invoke the Restricted Access Valet Mode for extra security while keeping the key. For instance, the processor can be programmed so that if the connector, key or key ring is reconnected to the remote control within an allowed, predetermined number of seconds, the Restricted Access Valet Mode is not turned off. This method, however, would run counter to the concept that having the connector, key or key ring in the remote control indicates that the system is in the Normal Mode, i.e. is not in the Restricted Access Valet Mode. In order to maintain this concept, the key can be carried separate from the remote control, or with the key or key ring reconnected to the remote control, a special Extra Security Mode indication can be provided.

For instance, the key and remote control can be physically held together by a quick-release key ring holder, one part of which passes through the remote control, the other through the connector, key ring or key.

Alternatively, the remote control and the connector, key ring or key can be logically (but not physically) separated by equipping the remote control with a passive receptor, or a key ring which passes through the remote control on which a passive receptor hangs.

The remote control can also be modified to have a second locking position, that is, a rest position, which does not send out a Normal Mode signal to the processing unit even though the key is kept with the remote control. In some cases, this can be achieved by providing for the connector, key or key ring to be partly pulled out of the receptor into, for example, a rest position with locking springs or the like to maintain the rest position.

A somewhat different modification for keeping the key and remote control together without turning on the Normal Mode, is shown in FIG. 5. In that embodiment, the connector, key or key ring can be adapted to be rotated, for example, ninety degrees in a direction opposite to the normal one into a rest position while providing means for preventing the connector from accidentally coming out of the remote control receptor without the application of force.

It is also contemplated that visible indication means are provided to show that the connector, key or key ring is logically separated from the remote control when the system is in the rest position. This indication can be made, for example, by having a colored band or mark on the outside of the connector, key or key ring which is visible when the connector, key or key ring is in the rest position, but invisible when the connector, key or key ring has been moved all of the way into the remote control receptor.

B. Coordination Of The Single-Key Security System With Conventional VAA/VTP Security Systems.

As earlier indicated, the Single Key Security System described above can be coordinated with conventional Vehicle Attack Alarm/Vehicle Theft Prevention (VAA/VTP) systems.

This coordination results in a Single-Key Security System with an Extra Security Mode which can be used when the driver self-parks the vehicle and wishes to provide extra security. The Extra Security Mode combines both the anti-theft features of the VAA/VTP with the Restricted Access Valet Mode protection offered by the Single-Key Security System.

With a passive VAA/VTP system, when the key, key ring, or connector is removed from the remote control and the key given to a valet, the Single-Key Security System is placed into its Restricted Access Valet Mode, as described above, and the VAA/VTP system is programmed to be automatically disabled, i.e., the system is also put into its conventional valet mode. To place the system into the Extra Security Mode, the remote control must be able to send the Restricted Access Valet Mode signal, but leave the passive VAA/VTP system in its normal state, so that it will arm the vehicle automatically. This requires providing the remote control with a mechanism for sensing that the connector, key or key ring, after triggering the Restricted Access Valet Mode of the Single-Key Security System, has not been removed from the remote control. This can be done, for instance, by equipping the remote control with a passive receptor or rest position as described above and a sensor, such as spring electrodes, either closing or opening a circuit momentarily. Alternatively, the connector, key or key ring, after removal can be re-inserted in the remote control within the permitted time, without causing a mode change, but causing a signal to be generated, indicating that the key has not been removed from the remote control and that the system is in the Extra Security Mode, rather than the Restricted Access Valet Mode.

The Single-Key Security System can be similarly coordinated with an active VAA/VTP system so that the VAA/VTP system is automatically placed in the armed condition when the Single-Key Security System is placed in the Extra Security Mode.

When changing the Single-Key Security System from its Restricted Access Valet or Extra Security Mode to the Normal Mode, the passive or active VAA/VTP system, if its state was changed, is also returned to its Normal Mode.

The coordination of Single-Key and VAA/VTP operations is accomplished by appropriate programming if one processor controls both functions, or, if two processors are involved, by communication between them and appropriate programming.

The coordination of the Single-Key Security System with a VAA/VTP system is an option and not a necessary feature of the present invention.

If non-removal from the remote control of the connector or key in the self-park situation is detected, controls and indicators are provided to reflect the addition of this mode, turning the system from a Normal Mode/Restricted Access Valet Mode system into a Normal Mode/Restricted Access Valet Mode/Extra Security Mode System.

C. Use Of The Single-Key Security Systems Using A Connector.

1. Overview

Figure 2:
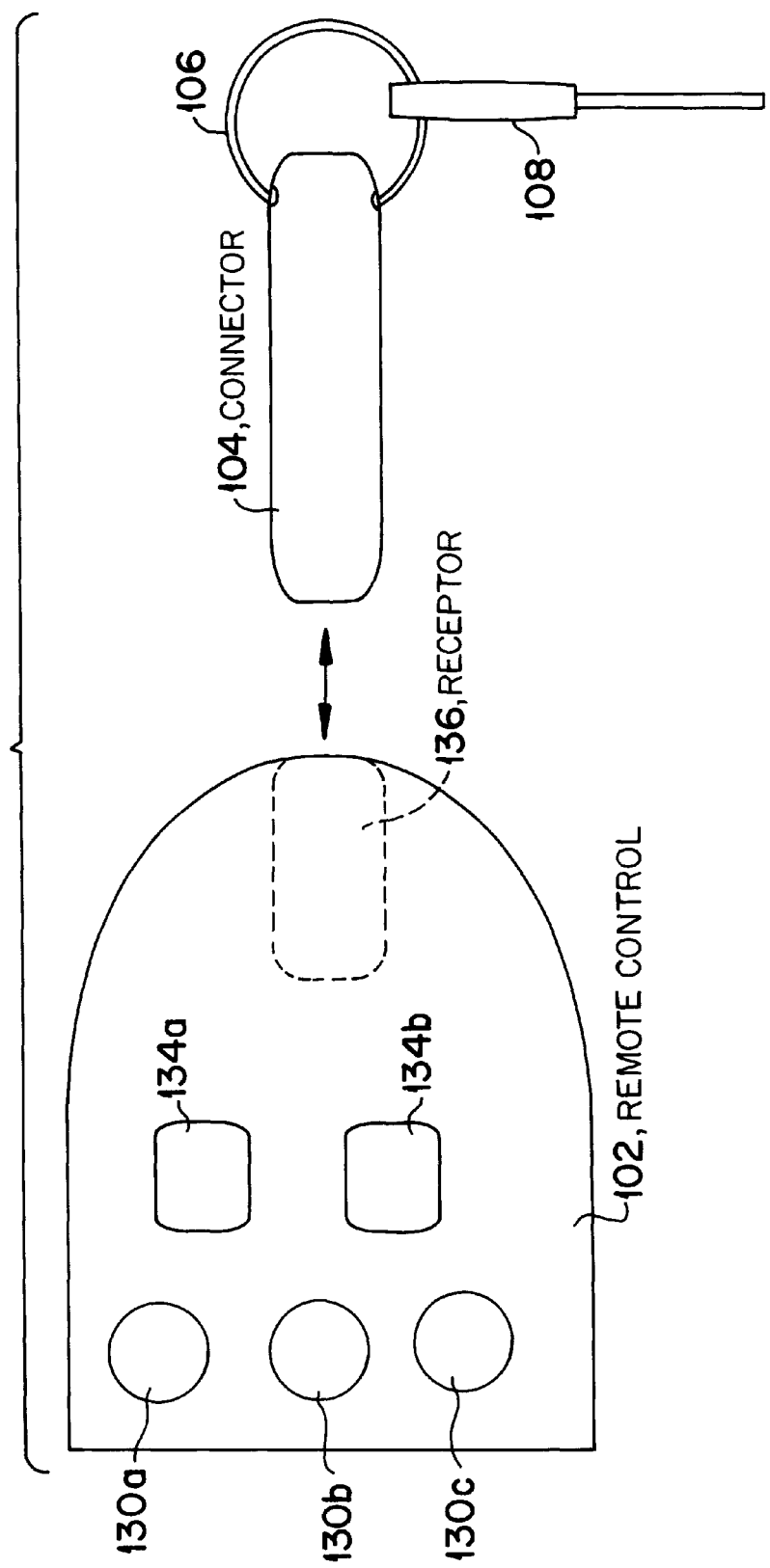
FIG. 2 shows the remote control/connector of FIG. 1 in greater detail.

FIG. 2 shows an embodiment of the remote control 102 and connector 104 in greater detail. As shown in FIG. 2, the connector 104 is insertable (and removable) from a receptor 136 in the remote control 102. When the connector 104 is removed from or inserted into the receptor 136, the remote control 102 causes a signal to be transmitted. Various embodiments of the connector 104 and receptor 136 are described in greater detail below, along with a more detailed description of their operation.

In some embodiments, the remote control 102 may include one or more buttons 130a–130c which can be used to operate and control other aspects of the vehicle's security either in conjunction with the connector 104 or independently thereof. In some embodiments, a different signal is caused to be transmitted by the remote control, depending on which, if any, of the buttons 130a–130c are depressed when or after the connector 104 is separated from or reconnected to the remote control 102. In this manner different systems and devices in the vehicle 110 can be independently controlled. For example, when the vehicle is in the Restricted Access Valet Mode, if, on the remote control, the "Open Trunk" button is depressed, the current path to the trunk will be restored, so that it can be opened with its dashboard or remote control button. In general, one or more of the devices which had their current path cut (by the vehicle being put in the Restricted Access Valet Mode) can have that path restored by depression of one or more buttons on the remote control. If the standard remote control has no buttons available for the particular devices/components of the vehicle (e.g., the glove compartment and the cellular phone), these buttons can be added to provide for this additional functionality.

As noted above, in addition to the functions of this invention, the remote control 102 preferably performs the same functions as existing remote controls and has the same buttons as existing remote controls. For example, the remote control of the Cadillac Catera has buttons for "Open Door" (push once for driver's door, twice for other doors), "Lock" all doors including fuel door; "Open Trunk" and "Open Fuel Door". If the Catera has an active VAA/VTP security system, pushing the "Lock Door" button again will arm it and pushing the "Open Door" button will disarm it.

Preferably the Single-Key Security System includes one or more mode indicators showing the system's current state. When the system is used with a motor vehicle 110, the mode indicators 132 (shown in FIG. 1) are provided on the vehicle's dash board or instrument panel or in a location visible to the vehicle's driver. In the case of a multi-mode vehicle, a mode indicator would light up with the words "Valet Mode" or "Restricted Access Valet Mode" or show an icon depicting the Restricted Access Valet Mode whenever the vehicle 110 is in this mode, with individual icons lit up showing which components of the vehicle are inoperable, e.g., whenever the ignition key is turned on or off or a mode change is made. Since the Normal Mode is the default, there is generally no need to indicate this mode on an indicator.

The mode indicators 132 may include means to emit a sound, for example, a chime, when the mode is changed.

The remote control 102 may also include one or more mode indicators 134a–134b, preferably LEDs. In a two-mode system, a single LED can indicate the mode the system is in. However, in a multi-mode system (for example, when the Restricted Access Valet Mode has degrees of control available), multiple LEDs or a single LED flashing with different frequency and/or pulse length can indicate the mode. As with the mode indicators 132 in the vehicle 110, actuation of the mode indicators 134a–134b can also cause emission of sound whenever the mode is changed.

Preferably both sets of mode indicators are extinguished after a predetermined fixed period of time, e.g., one minute. However, the remote control 102 can store the mode and indicate it on the mode indicators 134a–134b in response, for example, to pressing one of the buttons 130a–130c or some other button. In this way a user can check the remote control 102 to see what mode the vehicle 110 was left in even after the mode indicators 134a–134b have been extinguished.

Various embodiments of mechanisms for the connector 104 and receptor 136 are now described with reference to FIGS. 3–5B. It is noted in this regard that when the connector 104 is removed from or inserted into the receptor 136, the remote control 102 generates and transmits a signal. The general approach is for the removal of the connector 104 from the receptor 136, or insertion of the connector into the receptor 136 to either momentarily close a normally open circuit in the remote control 102 or to momentarily open a normally closed circuit.

As noted above, the remote control 102 is preferably the same as the one which controls other aspects of the vehicle's locking and security system, such as the vehicle's VAA/VTP security system if it has one. Such remote controls are well known. The present invention requires modification of a standard remote control to include the receptor 136. In some cases this modification might require enlargement of the remote control.

2. Embodiments where the connector performs both electrical and mechanical functions.

Figure 3:
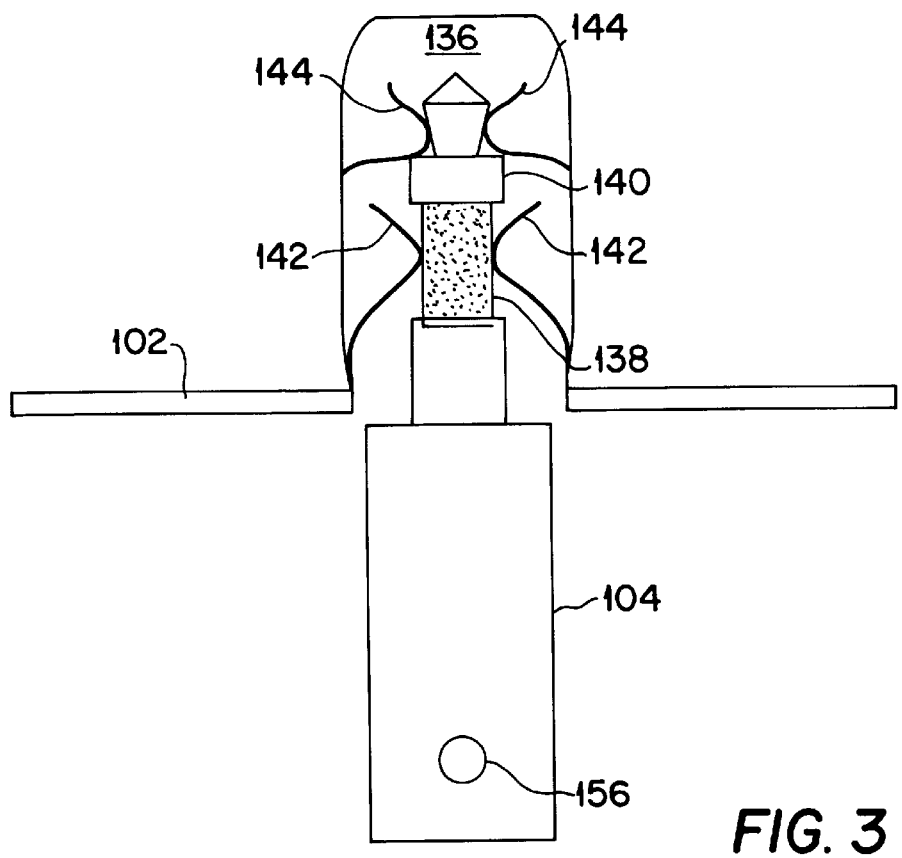

With reference to FIG. 3, the connector 104 and receptor 136 have a structure like a standard audio plug and jack. In this embodiment, the connector performs both a mechanical and an electrical function. Consequently, this type of connector cannot be eliminated nor can its function be taken over by the key or key ring unless the key or key ring is modified to provide both mechanical and electrical functions.

In the embodiment shown in FIG. 3, the connector plug has an insulated portion 138 and an electrically conductive portion 140. Preferably a small plug, for example, one with a sub-miniature diameter, such as 3/32", is used. Receptor 136 contains one pair of spring electrodes 142 located near the entrance to the receptor.

In operation, when the connector 104 is pushed into (or removed from) the receptor 136 the two spring electrodes 142 are momentarily connected (as the conductive portion 140 of the connector 104 passes through them). When the connector 104 has been fully inserted into the receptor 136, the insulated portion 138 of the connector prevents closure of the circuit containing the spring electrodes 142. In this manner the required (momentary) closing of a circuit is performed and the remote control 102 generates and transmits the appropriate signal.

Preferably the receptor 136 of FIG. 3 includes one or more locking springs 144 which serve to retain the connector within the receptor 136 and avoid accidental disconnection of the connector and the remote control.

Figure 4:
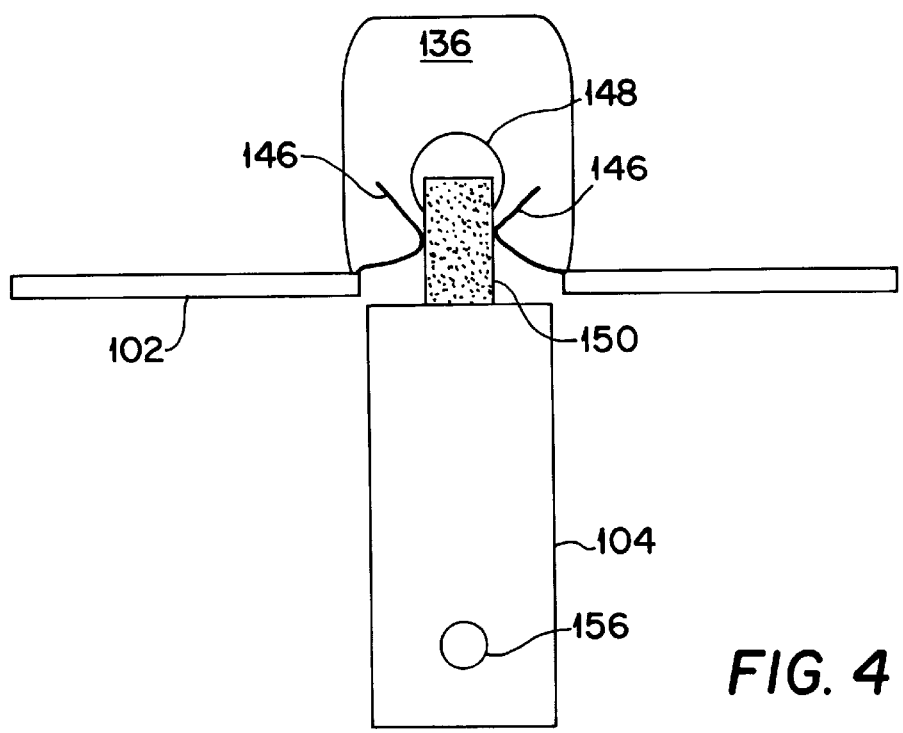

In the connector embodiment shown in FIG. 4, locking springs 146 also function as electrodes. Thus, when connector 104 is inserted into or removed from receptor 136 of remote control 102, an electrically conductive, metal portion 148 of the connector 104 passes briefly through the electrodes 146, thereby closing a circuit. When the connector has been fully inserted into the receptor 136, the insulated portion 150 of the connector 104 prevents closure of the circuit containing the two electrodes 146.

The embodiment of FIGS. 3 and 4 can be modified to indicate that the connector has not been completely removed when it is in the rest position, referred to herein as the Extra Security position, by adding sensors to the receptor and, if necessary, modifying the conducting/insulating parts of the connector, so that when the connector is inserted from the outside, two momentary contact closures occur, and when the connector is also withdrawn completely two momentary contact closures occur, but if it is withdrawn only to the Extra Security position, only a single contact closure occurs.

In the embodiments shown in FIGS. 3 and 4, if it is desired to detect insertion versus removal of the connector, a second pair of insulating/connecting portions can be added to the connector, with the connecting portion having a length different from the first connecting portion. This would, e.g., cause a dot-dash signal to be generated upon insertion of the connector and a dash-dot signal upon removal of the connector.

It will be appreciated that the connector, as referred to herein, is a device, separate from other devices, which mechanically connects a key or key ring, secured to the connector, to the remote control via the remote control's receptor 136. If a connector, like those shown in FIGS. 3 and 4, in addition to the mechanical connection function, also performs an electric current switching function, going through states of conduction and insulation of an electric current, it can be referred to as a "connector switch". However, because in several embodiments of the invention, other than those of FIGS. 3 and 4, the connector has only a mechanical function, all connectors, switching and mechanical-only, are referred to by the generic term "connector".

3. Embodiments where the connector performs only a mechanical function.

Figure 5A:
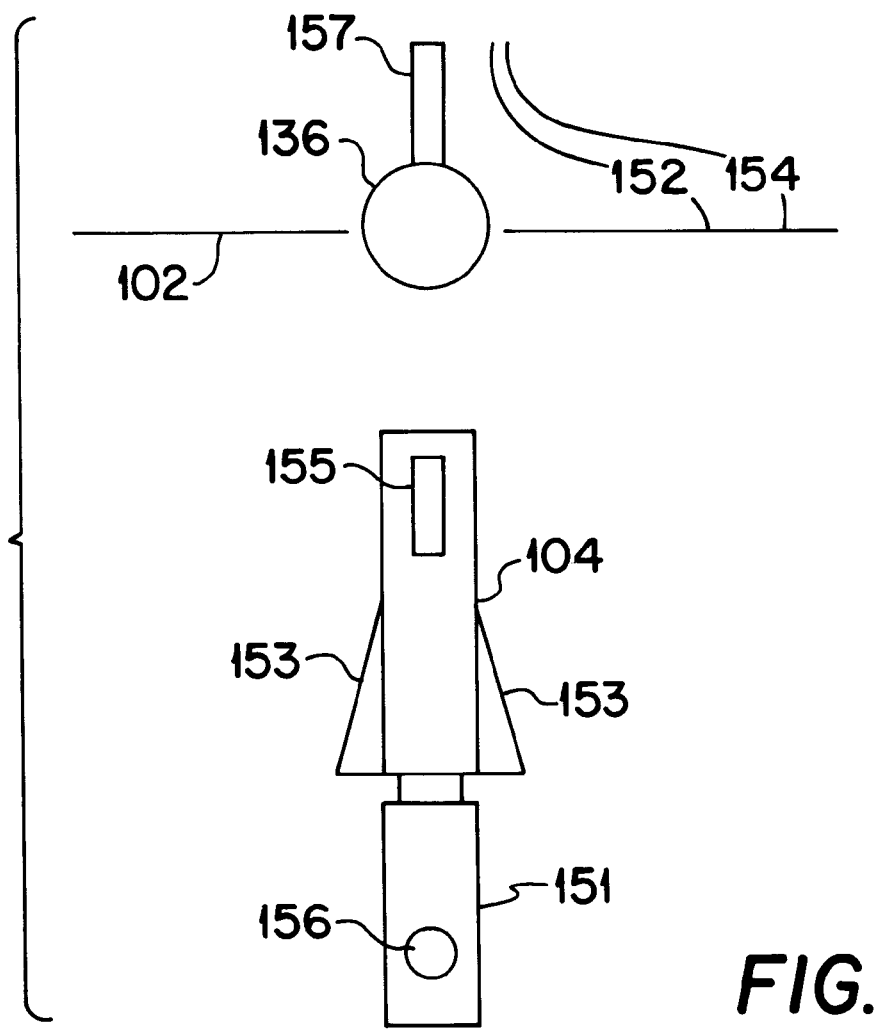
Figure 5B:
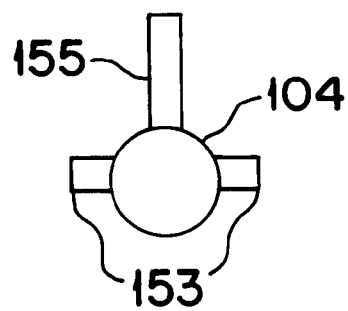
Figure 7A:
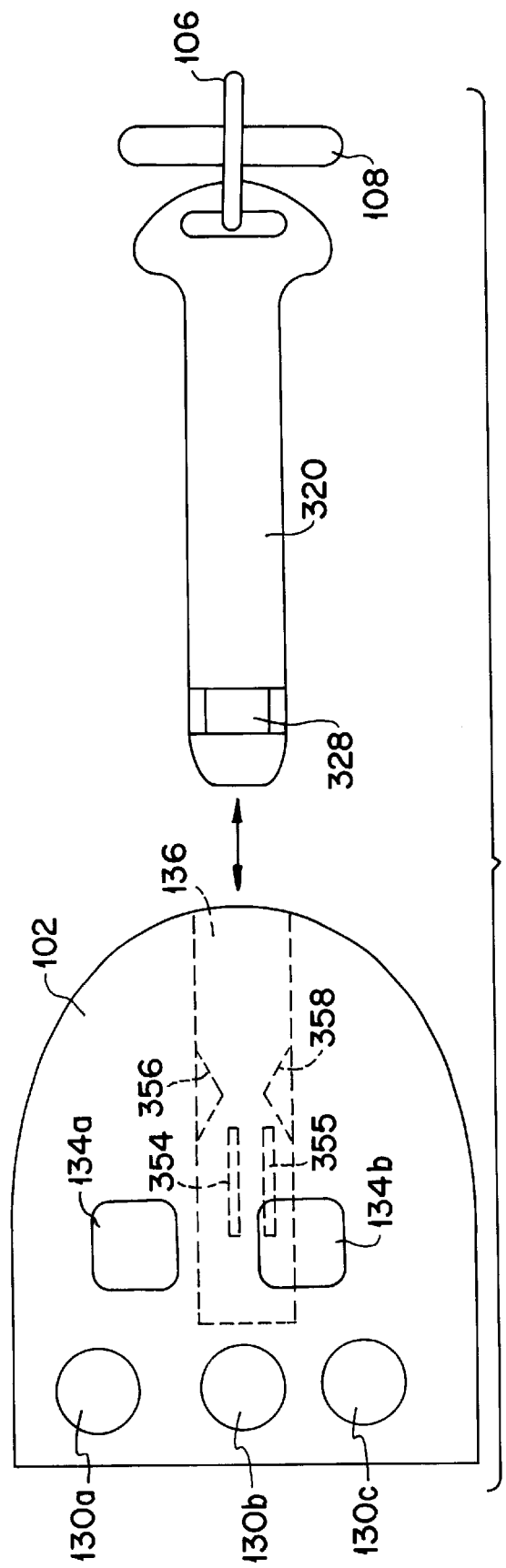

In the connector embodiment depicted in FIGS. 5A–5B, the receptor identified generally as 136 contains two separated spring electrodes 152, 154. The remote control generates and transmits a signal when the circuit containing the two electrodes 152, 154 is closed. In this embodiment, the connector 104 has two or more grip wings 153 and a connector fin 155. The connector 104 is inserted into the receptor 136 such that the fin 155 passes through connector fin hole 157. Insertion or removal of the connector 104, and rotation of it ninety degrees, brings together the two electrodes 152, 154 by the action of the connector fin 155 pushing the electrode 152 into contact with the electrode 154. The connector's grip wings 153 are used to aid the turning of the connector. A rotator 151 on connector 104 allows the key ring to remain stationary while the connector 104 is rotated.

It will be appreciated that the arrangement shown in FIGS. 5A and 5B can be varied. For example, the wings 153 and fin 155 can be replaced by other equivalent means to perform the indicated functions.

In each of the embodiments shown in FIGS. 3–5B, the connector is provided with a slot or hole 156 formed therethrough for connection to a key ring 106 (for example, as shown in FIG. 2).

In another embodiment, similar to that shown in FIG. 4, the connector 104 performs no electrical function itself and a spring-loaded slider (not shown) blocks the entrance to the receptor 136. As the connector 104 is pushed into the receptor 136, the slider is moved at right angles to the direction of travel of the connector, causing momentary contact to be made between a metal area on the surface of the slider and two separated spring electrodes. The contact can also be formed by having a projection on the slider to force the two electrodes together momentarily. See, for example, the spring electrode arrangement of FIG. 5A. As the connector moves into its final position, the slider moves back against the neck of the connector, locking it in place. Preferably the head and neck of the connector and the slider are shaped so as to require more force to withdraw the connector than to insert it.

Instead of, or in addition to, the spring locking mechanisms used to lock the connectors in place, various other locking mechanisms can be used. In some embodiments, locking may be achieved using a mechanism where two cylinders, one smaller than the other, are locked together by having a protruding ring on the inside of the larger cylinder snap-lock into a circular groove on the outside of the smaller cylinder (or vice versa).

In some embodiments the grooves and rings can be omitted and the parts can be made to fit tightly together.

Alternatively, locking can be achieved by having a freely rotating ring with screw threads on its inside which fits over the connector 104. A barrier on the outer surface of the connector 104 prevents the ring from coming off the connector. A mating portion corresponding to the ring, with screw threads on its outside, is provided at the entrance to the receptor 136. The connector 104 can be locked in place within the receptor 136 by tightening the rotating ring.

In another embodiment, the receptor entrance is blocked by a spring-loaded sliding mechanism. As the sliding mechanism is manually pushed away from the entrance toward the center of the remote control 102, contact is made between two electrodes which, in turn, causes the signal to be generated and transmitted. In this embodiment, the connector may have a spherical head, a short stem and a cylinder with a key ring hole at the other end. The slider mechanism must be held in its end position in order to allow the connector to be inserted. Once inserted, the slider mechanism is released, locking the connector head in place. To release the connector, the slider mechanism is moved, held in its end position, the connector is taken out and the slider mechanism is released.

In a variation of the previous embodiment, the entrance to the receptor 136 is obstructed by an L-shaped structure, the horizontal portion of the structure blocking the entrance and being hinged at the end opposite the obstructing part. A spring electrode, with a second electrode below it, keeps the other end of the horizontal part up, obstructing the receptor entrance. A push button is located with its bottom touching the horizontal part of the L-shaped structure at about its middle point. When the push button is depressed against the force of the spring electrode the receptor entrance obstruction is moved down, the electrodes make contact and the connector is inserted. When the push button is released, the electrodes separate, the obstruction moves back up and the connector head locks in. The same procedure is used to remove the connector.

4. Embodiments using magnets.

Generally speaking, the above embodiments generate an electrical pulse by temporary contact of spring electrodes during insertion/removal of the connector from the remote control. In another embodiment according to the invention, a magnet is positioned in the connector to function in conjunction with a coil or its equivalent in the receptor. The magnet and coil are arranged so that motion of the connector relative to the receptor induces a current in the receptor's coil. This induced current is then used to cause the remote control to transmit the appropriate signal.

The magnet in the connector, because of its magnetic field, may constitute a hazard to magnetic-stripe credit cards. Accordingly, an embodiment has been designed with the magnet in the receptor, where its distance from any credit card is increased and, if necessary, shielding can be provided. Also, an additional magnetic field detection device is used as a magnet-operated switch. This embodiment has the advantage of not having any exposed electrical parts and, therefore, is suitable for contaminated environments or accidental immersion in water or exposure to rain. Also, its operation is not sensitive to the speed with which the connector is inserted or removed, as opposed to an inductor-based embodiment.

FIGS. 6A–6E show such an embodiment. In this embodiment, receptor 136 contains magnet carrier 302 which is located in magnet carrier cavity 304. Magnet carrier 302 is capable of moving in cavity 304. Magnet carrier 302 carries magnet 306. Spring 308 is attached to one end of magnet carrier 302. When the connector has not been placed in the receptor, the spring is in an unrestrained "up" position, i.e., the end of spring 308 which is not attached to magnet carrier 302 extends up into spring cavity 310. The end of spring 308 which is not attached to magnet carrier 302 is adapted to hook onto connector 320 as shown in FIG. 6C when the connector is pushed into spring cavity 310.

A stationary-magnet cavity 312 is positioned so that a portion of the cavity is above magnet carrier cavity 304. Stationary-magnet cavity 312 contains stationary-magnet 314. Stationary-magnet 314 is connected to spring electrode 316. One end of spring electrode 316 is attached to a wall of stationary-magnet cavity 312. The other end of spring electrode 316 is positioned in stationary magnet cavity 312 so that a portion of spring electrode 316 can overlap with spring electrode 318. When the connector has not been placed in spring cavity 310, spring electrodes 316 and 318 are separated, and consequently, constitute an open switch.

Connector 320, which is non-ferrous to avoid interaction with stationary-magnet 314, has one end 321 which is adapted to attach key ring 106 and/or key 108. A spring hole 328 is located near the other end 322 of the connector which is of reduced thickness to allow spring 308 to fit into magnetic carrier cavity 304.

When connector 320 is inserted into receptor 136 of the remote control 102, the connector pushes magnet carrier 302 back into magnet carrier cavity 304. As connector 320 pushes magnet carrier 302, spring 308 is forced into hole 328 of the connector. When the connector reaches its end position inside the receptor, it is locked in place by a pair of receptor springs (not shown) which fit into indentations (not shown) in the sides of connector 320.

The connector can be modified to contain a second set of indentations to lock the connector into the Extra Security position. To indicate that the system is not in the Restricted Access Valet Mode but in the Extra Security Mode, after the connector has been pulled out or back, changing the system from the Normal to the Restricted Access Valet Mode, it is pushed to the end position and then forward to the Extra Security position, within the allowed time interval. In place of the described locking system, a single locking spring, fitting into holes in the connector, can be used.

As connector 320 moves into spring cavity 310 and connector end 322 pushes on magnet carrier 302, the magnet carrier moves back into magnet carrier cavity 304. As the magnet carrier moves back into the magnet carrier cavity, carrier-magnet 306 moves into alignment with stationary-magnet 314. As the carrier-magnet and the stationary-magnet become aligned vertically, they are attracted, causing stationary-magnet 314 with spring electrode 316 to move down towards spring electrode 318, closing the previously open circuit in stationary-magnet cavity 312.

As the connector keeps pushing on magnet carrier 302, carrier-magnet 306 moves out of the vicinity of stationary-magnet 314, and the attraction between the two magnets lessens. As this attraction lessens, spring electrode 316 moves back up, away from spring electrode 318, breaking the contact between the spring electrodes, re-opening the circuit in stationary-magnet cavity 312. As a consequence of the contact between the two spring electrodes, a mode change signal is transmitted to the motor vehicle. When the connector is withdrawn from the receptor cavity, the same sequence of events occurs in reverse and magnet carrier 302 is decoupled from the connector when it has been pulled to a point where spring 308 moves up, out of connector hole 328 and into receptor cavity 310.

When the system is placed in the Extra Security Mode, the connector is locked at a position sufficiently to the right of stationary-magnet 314 to preclude carrier-magnet 306 from moving down to stationary-magnet 314.

Magnets 306 and 314 may be made of any suitable material and may vary in their dimensions. Typically, however, magnets 306 and 314 are ⅛" diameter, ¹⁄₁₆" thick Neodymium-Iron-Boron rare-earth supermagnets (e.g., Radio Shack Catalog No. 64-1895). They may also comprise smaller rare earth magnets, or other types of magnetic materials.

5. Connector embodiment using a flat, conductive receptor slider.

The magnet carrier mechanism described above and shown in FIG. 6 can be modified in various ways, for example, by replacing the magnet with a conductor element. Such a modification is shown in FIGS. 7A–7D where magnet carrier 302 has been replaced with slider 350. This slider has a conducting strip 352.

As the slider is pushed or pulled, the conducting strip momentarily connects spring electrodes 354, 355. Locking springs 356, 358 snap into indentations 360, 362, 364, 366 to lock the slider and connector in the Normal Mode or in the Extra Security Mode position. The connector is made of non-conducting material so that it cannot provide a current path between electrodes 354, 355.

6. General comments about connector embodiments.

It will be appreciated that for each of the embodiments described above, the connector can have a slot 156 in it so that it can be connected to a key ring, for example, key ring 106 with key 108 (see FIG. 2). Additionally, in each of the embodiments which have been described, the connector can be incorporated or integrated into key 108 or key ring 106. For example, the connector can be formed on the handle of the key. In this manner, whenever the key is separated from the remote control, the system enters the Restricted Access Valet Mode.

The above designs are not exhaustive, and variations are contemplated. For example, in the first embodiment (FIG. 2), the roles of connector and receptor may be reversed, with the plug becoming the receptor and the jack the connector. Further, while the described embodiments have normally-open, single-pole, single-throw switches, other types of switches may be used.

In general, in operation of this invention, separation of the connector from the remote control causes generation of a signal which places the vehicle in the Restricted Access Valet Mode. And, generally, re-attaching the connector to the remote control causes generation of a signal which places the vehicle in the Normal Mode. However, processing unit 116 can be programmed to ignore signals subsequent to the first for a limited period of time, allowing the connector to be re-attached without placing the system back into the Normal Mode.

It will be appreciated that the functions performed by the connector can, for many of the above embodiments, be performed by either the key ring or the key.

D. Single-Key Security Systems Without a Connector.

1. Embodiments where the receptor has a ring-with-a-gap.

Figure 8:
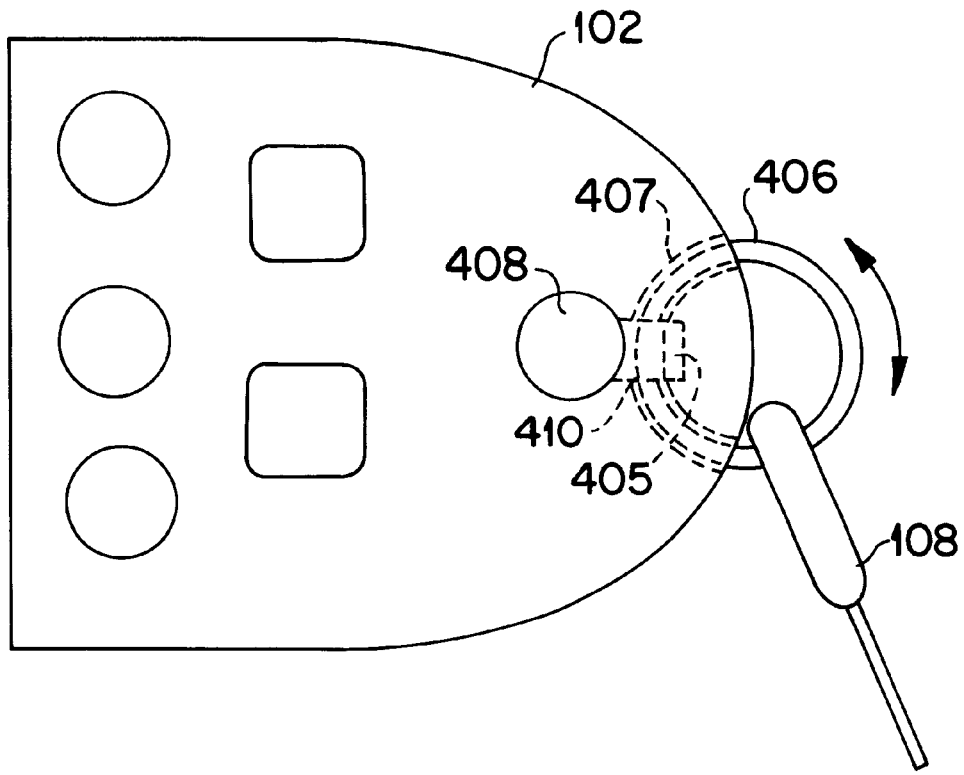
FIGS. 8–10, 11A AND 11B depict various embodiments of the remote control/key ring switching mechanism according to the present invention.

A "connector-less" embodiment of this invention is shown in FIG. 8. This embodiment, which is given for illustrative purposes only, uses a remote control 102 and a non-removable, rotatable ring-with-a-gap 406. The ring-with-a-gap performs the mechanical functions of the connector described in previous embodiments above. A key 108 or a key ring is attached to the ring-with-a-gap 406. The ring-with-a-gap fits through a circular passage 407 in the remote control 102, with the gap normally in the center line of the remote control.

The remote control has a push button 408. A fin 410 or like structure extends at the bottom of the stem of the push button and sits in the gap 405 of ring 406, preventing the ring from being rotated. The electrode arrangement of the implementation shown in FIG. 8 may be the same as that shown in FIG. 9. The latter figure shows spring electrodes 412, 416, 418 which, in the arrangement of FIG. 8, would be located below push button 408. Depressing push button 408 moves fin 410 down, out of the gap of the ring and also causes contact to be made between spring electrodes 412, 416 under the push button. This contact causes the remote control 102 to generate and transmit a signal. Ring 406 can then be rotated to expose the gap and permit the key or key ring to be extracted. Push button 408 remains in the depressed position until ring 406 is rotated back and fin 410 snaps into the gap.

When the driver self-parks the motor vehicle, the remote control's ring is not rotated, and only the mode change push button is depressed. If the key is to be given to a valet, the push button is depressed and the ring-with-the-gap is rotated to expose its gap and enable removal of the key through the gap. To detect if the ring has been rotated after the push button has been depressed, the normally open switch, formed by spring electrodes 412 and 416, which is closed when the push button is depressed, is monitored. If it is found to be open, i.e., the push button is in the up position, the ring has not been rotated and the key has not been removed, putting the system in the Extra Security Mode. If instead, the switch formed by spring electrodes 412 and 416 is found to remain closed for a time, say, several seconds, the ring is being rotated is and, presumably, the key taken off to give to a valet, so that the system is put in the Restricted Access Valet Mode.

To allow the ring with the gap to remain with the gap outside the remote control after the key has been removed and to avoid current drain, a second, normally closed switch 416, 418, in series with the normally open switch 412, 416, designed to open after the normally open switch has closed, is provided. Electrode 416 contacts electrode 418 at a place some distance from the contact point with electrode 412 of the normally open switch and is designed, e.g., by thickness variation to be pushed some distance by contact with electrode 412 before it separates from electrode 418. With this design, the two switches are in series with connection points 412 and 418, without any wiring.

Figure 9:
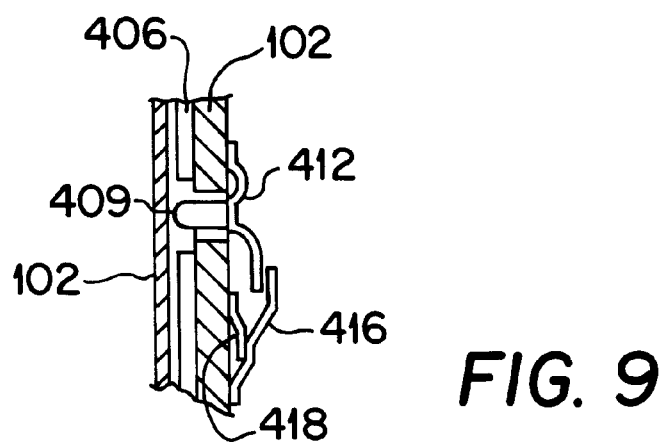

The implementation shown in FIG. 9 is a push-button-less version of that shown in FIG. 8, in which the mode change button has been eliminated and replaced by an obstruction 409 with a semi-cylindrical head, spring-loaded by spring electrode 412. To rotate ring 406 and bring out the gap, obstruction 409 must be pressed back by contact with one of the gap ends of ring 406, the gap end riding over obstruction 409.

In a design that does not increase the height of the remote control, obstruction 409 and its associated electrodes, etc., would be rotated by ninety degrees.

2. Embodiments where the receptor has a movable entry/exit obstruction.

In the connector-less embodiments described below, a key with a small-width key hole upper border, plastic or metal, curved or straight, can be used in place of the key ring 106 that is put into a receptor. While this can be done, it will usually be preferable to use a key ring to provide more motional flexibility, so that the key and remote control can assume a parallel position when carried in a pocket and a right-angle position when the key is in the ignition lock.

Figure 10:
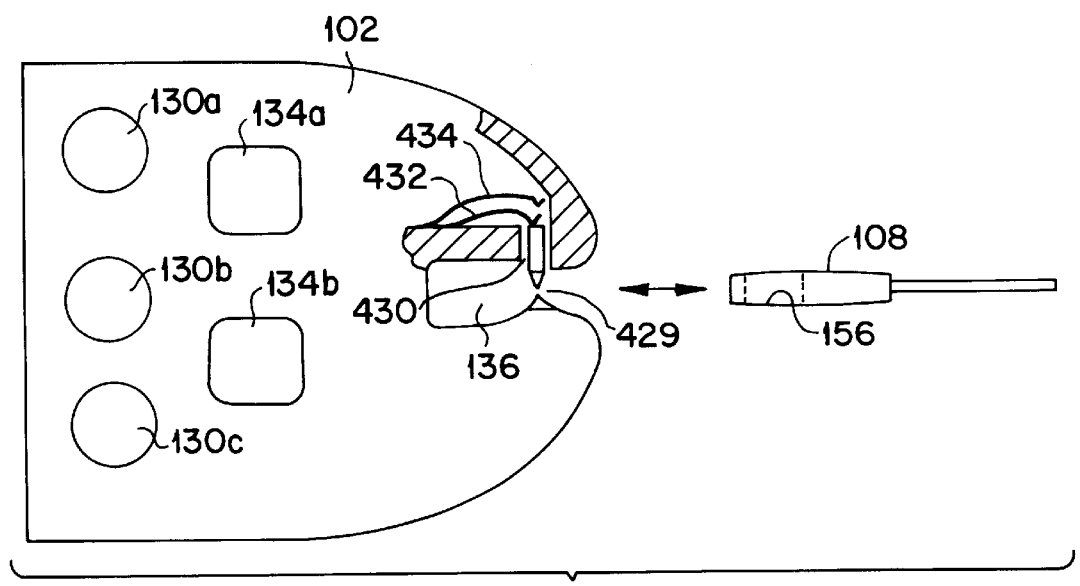

In the connector-less variation shown in FIG. 10, receptor 136 has a circular-walled slot 429 open to the outside to accept a key 108 or a key ring. Receptor 136 is also provided with movable slider 430, which can be cylindrical with a conical or semi-spherical head, movable at right angles to the direction of travel of the key or key ring. When key 108 or key ring 106 is pushed into the receptor, the slider is moved, causing momentary contact to be made between electrodes 432 and 434, generating a signal. After key 108 or key ring 106 has passed the slider, the slider moves back into the key's hole 156 or the inside of the key ring, locking in the key or key ring, and the spring electrodes move apart.

Alternatively, the entrance to the receptor 136 is obstructed by an L-shaped structure. This L-shaped structure is positioned such that its horizontal portion blocks the entrance to the receptor. The end of the vertical portion of the L-shaped structure at the end opposite the horizontal obstructing part, is hinged. A spring electrode, with a second electrode below it, keeps the horizontal part up, obstructing the receptor entrance. A push button is located with its bottom touching the vertical part of the L-shaped structure at about its mid-point. When the push button is depressed against the force of the spring electrode, the receptor entrance obstruction is moved out of the way, the electrodes make contact and key 108 or key ring 106 can be inserted in a plane parallel to the large surfaces of the remote control. When the push button is released, the electrodes separate, the obstruction moves back up and the key or key ring is locked in. The same procedure is used to remove the key or key ring.

Since the mode can be changed by depressing the push button and not removing the key or key ring, a sensing switch in the small space between the circular back wall of the receptor and the inside of the obstructing part can be interrogated to determine if the system should be in the Restricted Access Valet or the Extra Security Mode. The sensing switch could be of the same type as that used in audio cassette recorders to detect if a piece of plastic is present or absent, indicating if the cassette tape can be recorded on or not.

This embodiment can be modified to eliminate the push button feature. The obstructing part of the L-shaped structure can be modified to have a semi-cylindrical or semi-spherical shape, so that pressure from a key ring or key from the outside or inside will force the obstruction out of the way, allowing the key ring or key to be moved in or out of the remote control. The action of pushing the obstruction with the key or key ring connects two spring electrodes, generating a signal.

3. Embodiments where the receptor has jaws.

Figure 11A:
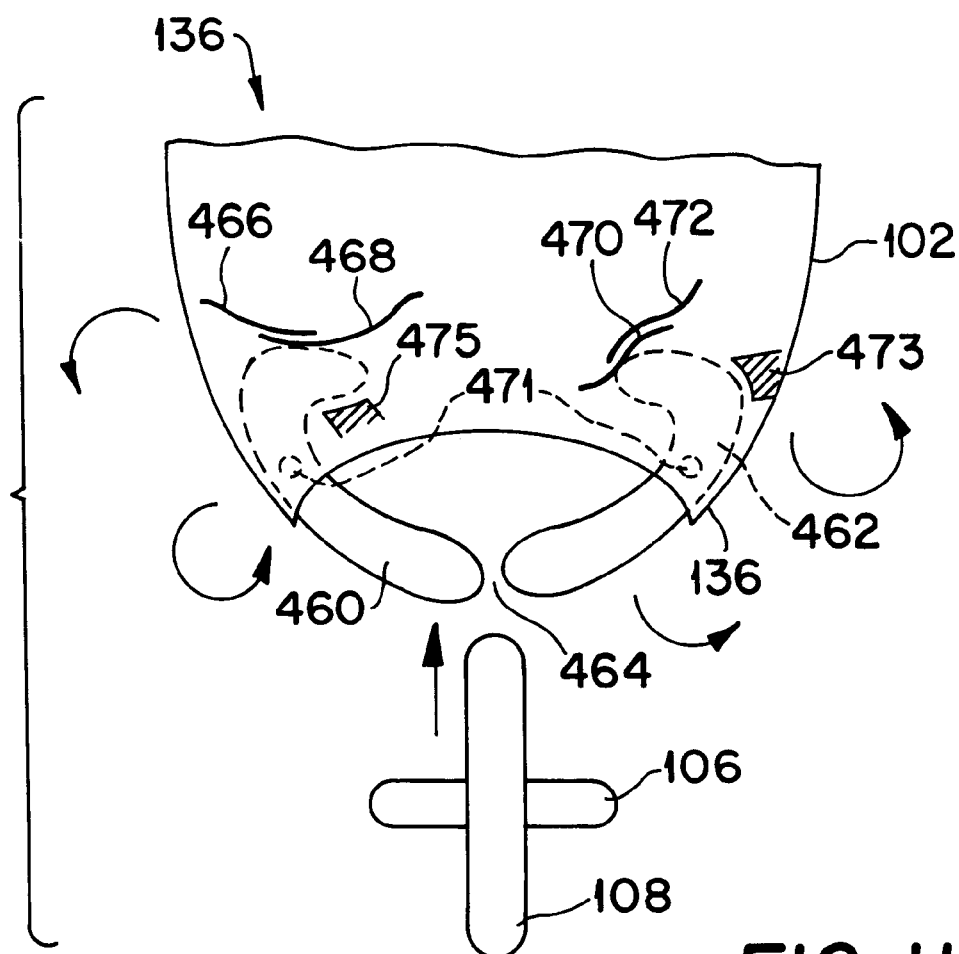
Figure 11B:
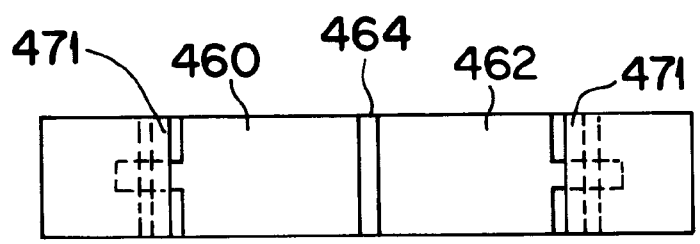

Yet another variation of the connector-less embodiment of the present invention is shown in FIGS. 11A and 11B, FIG. 11A being a partial elevation view while FIG. 11B is a view from the front of the receptor 136. In this embodiment, the receptor 136 includes two hinged, rotatable, spring-loaded, usually curved jaws 460, 462, which extend from inside the receptor out to receptor cavity 464, suitable for receiving either key 108 or, alternatively, key ring 106, with the end of one jaw constituting the entry gate of receptor cavity 464, the other, the exit gate. The inside end of entry jaw 460 is located near electrode pair 466, 468. The inside end of exit jaw 462 is located near electrode pair 470, 472.

When a key 108 or key ring 106 is inserted into the receptor, entry jaw 460 is rotated counterclockwise around its hinge 471 while the other (exit) jaw remains stationary because of stop 473. The jaws reverse roles when the key or key ring is removed, with jaw 462 moving counterclockwise around its hinge 471 while jaw 460 is restrained by its stop 475.

As they move, the jaws momentarily close the previously open spring electrodes.

In a variation of this embodiment there is only one movable jaw, the entry jaw of FIG. 11 being redesigned so that it can rotate both clockwise (Exit) and counter-clockwise (Entry), with a pair of spring electrodes on each side.

In all of the above embodiments, because of the use of two pairs of electrodes, it is known whether the key or key ring is being inserted or removed.

E. Single-Key Security Systems for Integrated Key/Remote Controls

1. Overview

The designs to be described are for use with remote controls integrated with the ignition key, as for instance, those currently used by Mercedes Benz and Ford-Europe. They can, however, also be used with separate remote controls.

The Mercedes Benz system has an Integrated Key/Remote Control which emits both infrared signals, e.g., for door opening and ignition, and R. F. signals for longer distance, obstructed-view applications, such as a panic alarm. It has a slot for an ordinary metal key that locks the glove compartment and the trunk, so that buttons on the Integrated Key/Remote Control and on the inside of the motor vehicle can no longer open these units. Before giving the Integrated Key/Remote Control to a valet, the driver has to extract the metal key, lock the glove compartment, go to the trunk, and lock it. The driver then has to carry the metal key. This method is inconvenient, and if the driver forgets to extract the metal key, the valet has access to all units of the vehicle.

The Ford-Europe system also has an Integrated Key/Remote Control, which emits infrared signals, but no second key. In the Ford-Europe system, therefore, when the Integrated Key/Remote Control is given to a valet, he has access to all parts of the vehicle.

The present invention improves upon these Integrated Key/Remote Control systems. For single-key systems, it provides a level of security not previously available. For two-key systems, it eliminates the locking and/or unlocking of individual access-controlled units by hand with a second key.

There is a major difference between Single-Key Security Systems for motor vehicles having a separate key and remote control and Single-Key Security Systems for motor vehicles having an Integrated-Key/Remote Control: with the exception of the "Split Integrated-Key/Remote Control" described next, when a vehicle with an Integrated-Key/Remote Control is turned over to a valet, the valet is given control over both the key and the remote control. To prevent the valet from changing the vehicle state from the Restricted Access Valet Mode to the Normal Mode, another element, usable only by the driver, must be introduced. This can be a secret number. Various ways to employ such a secret number, which must be system-specific, or an equivalent provision, will be described.

2. Split Integrated Key/Remote Control

Figure 12:
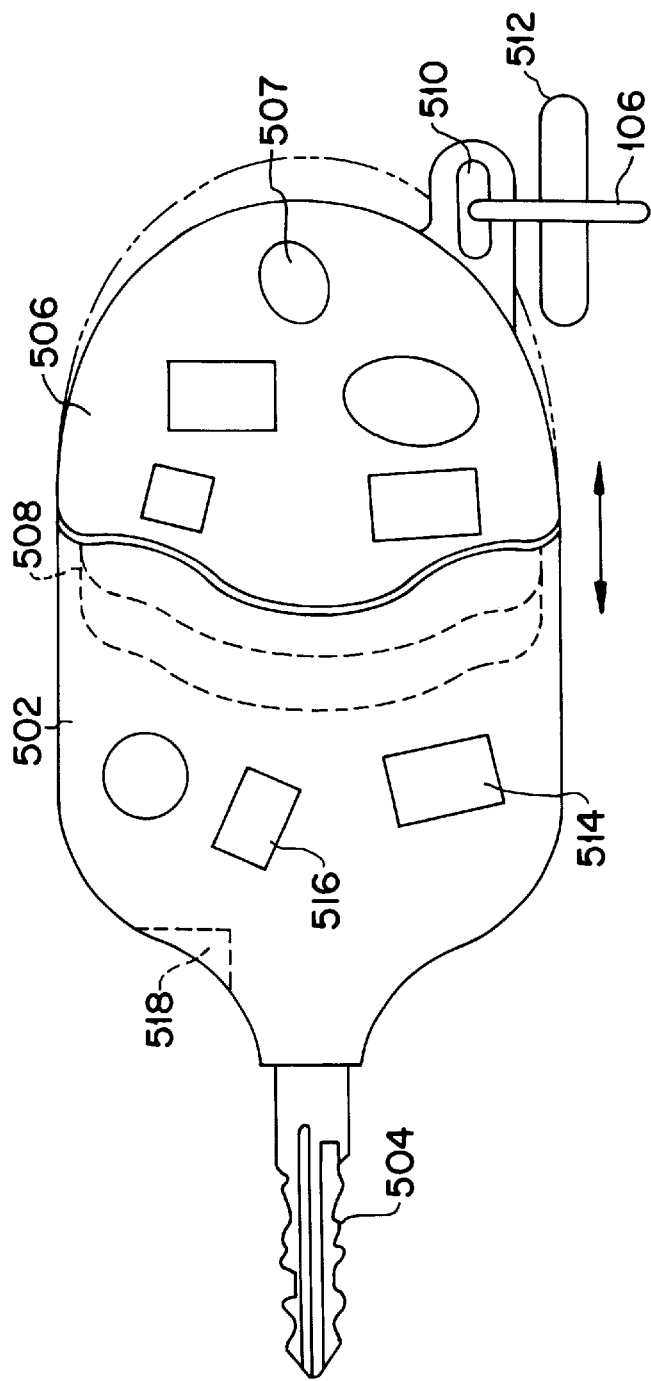
FIG. 12 depicts an embodiment of an integrated key/remote control switching mechanism according to the present invention.

In this embodiment, which is shown in FIG. 12, the Integrated Key/Remote Control can be physically separated into two parts, as shown by the broken lines. One part of the Integrated Key/Remote Control, Key Remote Control 502, is physically integrated with key 504. It can be given to a valet. The other part of the remote control, Driver Remote Control 506, remains with the driver.

The two remote control parts fit together to appear and function like a single remote control. They can be electrically and mechanically interconnected by one or more plug/jack connections.

The plug parts of the connection can be in either remote control, but since drivers will mostly carry their remote control in a pocket, to avoid damage to clothing and the plugs, it may be preferable to have the plugs in the Key Remote Control.

One of the plug/jack connections can include momentarily closed switch contacts, putting the system in the Restricted Access Valet Mode when the two remote controls are separated, and, when they are rejoined, putting the system in the Normal Mode.

One of the plug/jack connections can provide battery power to Driver Remote Control 506, and one can provide a communication link between the remote controls.

The casings of the two remote controls may overlap and provide a locking function by a tight fit or by a snap-together ridge/groove arrangement. Locking functions can also be provided by locking springs in jacks, which may also act as electrodes, and by a plastic latch arrangement with hooks on the inside of the casing of one remote control which, with the casing flexible at the hook location, ride over and snap in behind ridges on the inside of the other remote control. To separate the remote controls, the remote control with the hooks is compressed by hand at the hook location, allowing the hooks to be pulled over the ridges. (A design used in a two-inch diameter tool container by Radio Shack, Catalog No. 64-1901).

In the case where the driver is self-parking the motor vehicle and wants the extra security of the Restricted Access Valet Mode, instead of carrying the two remote controls separately, the Driver Remote Control is partially pulled out of the Key Remote Control, putting the system in the Restricted Access Valet Mode, and locked into the Extra Security Mode position. Locking can be by springs in the jacks or by ridge/groove locks in the overlapping casings.

In another version of this design, except, possibly, for insertion, separation and Extra Security Mode position sensing, all interactions between the remote controls take place via face-to-face pairs of infrared emitters and receivers, one of which, if possible, transmits power to the Driver Remote Control. If not possible, a battery power source is included in the Driver Remote Control.

The Driver Remote Control has buttons 507 for the Trunk, Fuel Door and other units not wanted under valet control. It has a processor and uses the signal radiation (RF, IR, US) facilities of Key Remote Control 502. Signals generated by the two remote controls are vehicle-specific, and if a valet were to plug in a Driver Remote Control other than that for the specific motor vehicle, none of the functions controlled by the Driver Remote Control could be performed.

Driver Remote Control 506 also has a key ring hole or slot 510 on which can be hung a key ring 106 with the items normally attached to ignition key rings, such as a tag embossed with the motor vehicle dealer's towing and service phone numbers, a metal disk giving the vehicle manufacturer's roadside service phone number, car ID number and address to which to mail a lost-and-found remote control, as well as keys, such as a house key 512.

Having these items on the Driver Remote Control, serves as a reminder not to give the entire remote control to a valet.

As the remote controls are separated, the processor in the Driver Remote Control generates a signal when it receives a momentary pulse as the electrodes in the receptor close when the connector moves out, and when the remote controls are rejoined and the connector moves in. Plug/jack connections between the two remote controls are designed to maintain contact until after a mode change signal has been transmitted to the Key Remote Control, which sends a signal to the motor vehicle. The communication link between the two remote controls provides communication in both the joined and the partially separated Extra Security positions. With an infrared design, the emitter/receiver pairs continue to interact.

If units, such as the fuel door, are to be exempted from the Restricted Access Valet Mode and made operable by the valet by depressing a button in the motor vehicle, the Driver Remote Control is placed in the Extra Security Mode position and the corresponding button, in this case the "Open Fuel Door" button, depressed. Then the Key Remote Control is turned over to the valet.

As in all implementations, icons on the instrument panel, or radio, and sounds can indicate the system status.

If the system status is to be interrogable by the Driver Remote Control, it would be equipped with LEDs and a battery.

If the remote control is in the Extra Security Mode position, a colored, say, yellow area on the inner casing is exposed to highlight that the system is in this mode.

Key Remote Control 502 by itself, separated from Driver Remote Control 506, performs all the functions a valet must be able to perform: ignition key operation and door locking and unlocking. It has, for example, two buttons 514 and 516 for the door functions, and an IR generator and emitter 518, if required for door or ignition key operation, along with, if desired, an RF generator and RF antenna, an ultrasonic generator and emitter and a processor and a battery.

3. Secret number entry via Integrated Key/Remote Control buttons.

In a second implementation of the present invention, the Restricted Access Valet and Normal Modes can be invoked by depressing buttons on the Integrated Key/Remote Control. For instance, the Restricted Access Valet Mode can be invoked by pressing the "Open Fuel Door" button, say, three times in five seconds. This operation disables the buttons on the inside of the motor vehicle and on the Integrated Key/Remote Control which normally open the trunk, glove compartment, fuel door (placed in the locked position after the Restricted Access Valet Mode invocation), etc., and also makes inoperable such units as the cellular phone.

If within the next, say, twenty seconds, before the Integrated Key/Remote Control is handed to a valet, any of the disabled buttons is depressed, the associated units are returned to the Normal Mode. For instance, if the "Open Trunk Button" on the Integrated Key/Remote Control or in the motor vehicle is depressed, the trunk can be opened by depressing one of the "Open Trunk" buttons.

To return the system to the Normal Mode, the "Open Fuel Door" button on the Integrated Key/Remote Control is depressed, say, continuously for at least three seconds, and then a secret number, like a PIN in an ATM is entered.

The secret number is entered by depressing the "Open Fuel Door" button on the Integrated Key/Remote Control, as follows, assuming numbers are four digits long, and each digit position can have a value from 1 to 6. The limit of 6 is based on the consideration that the higher this number, the higher the likelihood of making a mistake.

Each digit is represented by the equivalent number of button depressions, the final depression being, say, 2 seconds long (a "dash"), the preceding digits being short ("dots"), button depressions to enter one digit to be completed in, say, 5 seconds.

With secret numbers 4 digits long, there are 1,296 possible numbers.

If the secret number is, say, 1,623, the button depressions would be: DASH; DOT-DOT-DOT-DOT-DOT-DASH; DOT-DASH; DOT-DOT-DASH.

The entered secret number is transmitted to the processor in the motor vehicle, where it is compared against a stored secret number and, if it matches, the system is returned to the Normal Mode.

Figure 13:
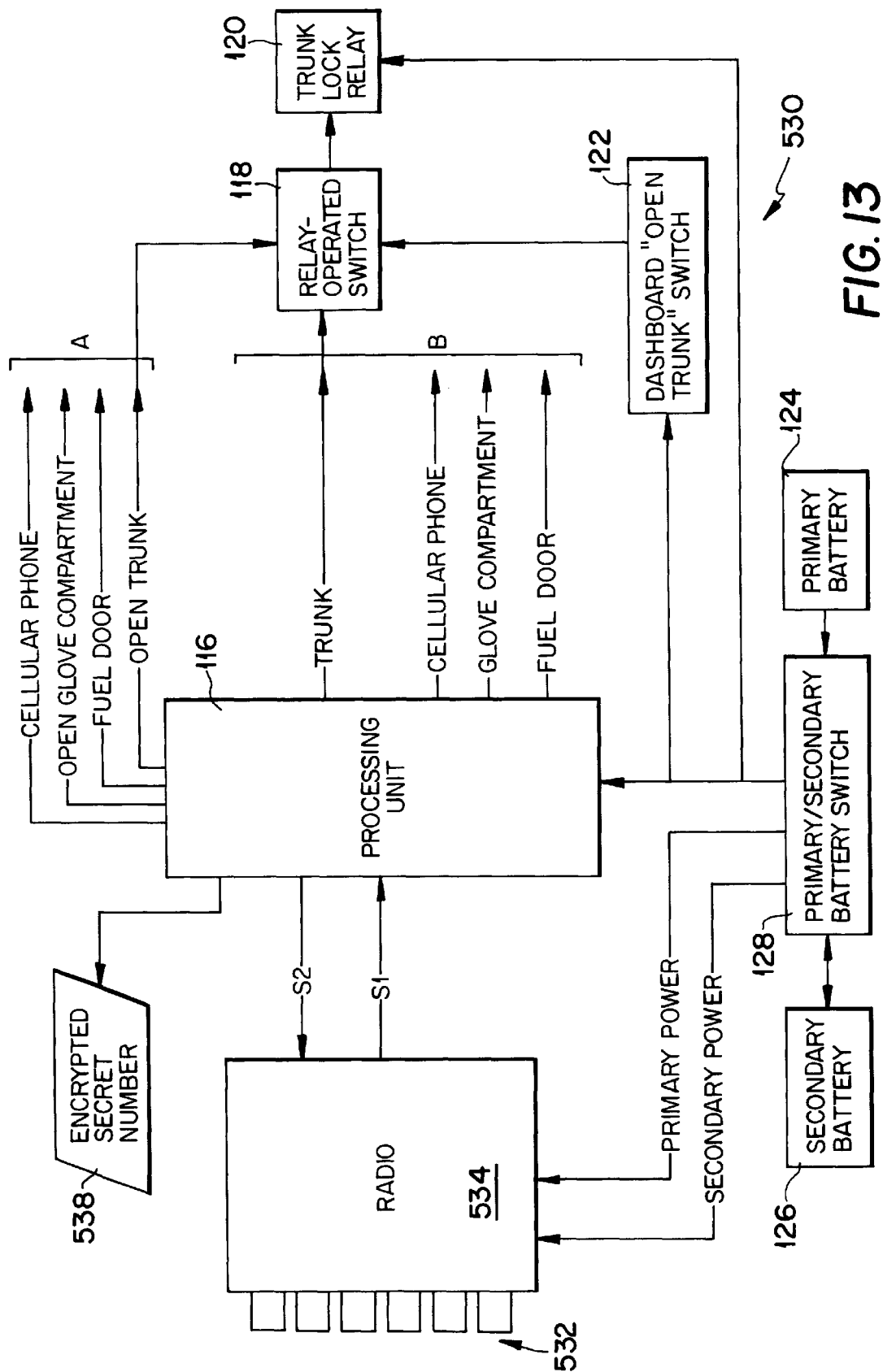
FIG. 13 is a schematic depiction of the single-key security system operating with a motor vehicle using a radio according to the invention.

The overall single-key security system is as shown in FIG. 1, except that the remote control, connector, key ring and key are replaced by an Integrated Key/Remote Control and the processing unit is replaced by a processing unit like that shown in FIG. 13 which stores the secret number and performs encryption and comparing functions.

Correct entry of the secret number can be indicated on the Integrated Key/Remote Control by a flashing green LED, incorrect entry by a flashing, red LED. LEDs can also give feedback for other button depression operations.

To remind the driver to change the system to the Restricted Access Valet Mode when turning the motor vehicle over to a valet, a sound can be generated every time the ignition is turned off and a phrase like "Restricted Access Valet Mode Off" could be displayed briefly on the instrument panel. If the system is in the Restricted Access Valet Mode, icons representing inaccessible vehicle components could be illuminated.

On the Integrated Key/Remote Control, LEDs could indicate the status of the system when the "Open Fuel Door" button is depressed, say, for at least three seconds.

The described implementation is illustrative. Variations can be designed using different buttons, e.g., a Valet Button on the Integrated Key/Remote Control to invoke the Restricted Access Valet Mode and enter the secret number, and different ways to enter the secret number. The embodiment is in no means limiting of the invention described in other sections. For instance, it can also be used in conjunction with the separate remote control and key systems described above.

4. Interaction with Vehicle Radio and Voice Recognition Systems.

Another embodiment of the present invention is now described with reference to FIG. 13 wherein a keypad (or push buttons 532) of a radio 534 is used to control the restricted access functions of the vehicle. This embodiment, designated generally in FIG. 13 as system 530, is similar to that of the system 100 shown in FIG. 1, except that commands are sent to the processing unit 116 via the radio 534 rather than the receiver 114 and antenna 112. (The keypad can also be, for example, the telephone's keyboard or a separate keyboard.) The push buttons 532 of the vehicle's radio function as the keyboard and are used to control the access restriction functions. By way of illustration, a typical car radio 534 with an audio cassette player and six radio station selector buttons is used. The functions associated with the various selector buttons can be varied depending on how often they are pressed (within a short period of time) and whether they are pressed in combination with other buttons.

For instance, the numbered station selector buttons are already switchable by the "Band" button to AM, FM1 and FM2. In this invention, an additional setting "Access Restriction" is added to the "Band" switch. When the radio is set to "Access Restriction" using the "Band" button, the station selector buttons are connected to an electronic circuit whose primary function is to store numbers, compare them with keyed numbers and control relays which supply current to the various locking mechanisms of the vehicle.

For example, to go into the Restricted Access Valet Mode, the vehicle's radio would be turned on and would be set to "Access Restriction" by pressing the "Band" button until "Access Restriction" is indicated on the radio's display. To restrict access to all units under access control, the "Scan" button would be depressed two times, causing the current paths to the trunk opening mechanism, the fuel door opening mechanism, and the cellular phone to be cut. Similarly, other units under access control, like the vehicle's glove compartment, equipped with an electrical unlocking control circuit like the trunk, would have their current paths cut.

To exit from the Restricted Access Valet Mode and return to the Normal Mode, a secret number, like a PIN in an ATM, must be keyed in while the radio is in the Access Restriction State. After the PIN is entered, the "Scan" button must be depressed once.

The operator of this system can also customize the Restricted Access Valet Mode. To re-enable just the trunk opening current path, the operator would set the radio to the Access Restriction Mode, press the "Scan" button once, press the "Side" button once, then press the "Scan" button again. To instead re-enable just the fuel door opening current path, the same procedure would be followed, except that the "Source" button would be pressed instead of the "Side" button. If the operator wanted to re-enable both the trunk and the fuel door opening current paths, between depressions of the "Scan" button, both the "Side" and the "Source" buttons would be depressed. Only a few seconds are allowed for these modifications, so that they cannot be carried out by the valet.

In general operation, when the radio 534 is in the Access Restriction State and its buttons 532 are depressed, it sends signals (e.g., button closing signals denoted S1 in FIG. 13) to the processing unit 116. The processing unit interprets the signals S1 in order to control the vehicle's modes. The processing unit sends signals (designated S2 in FIG. 13) back to the radio, e.g., in order to provide the radio with the status of the system, so that the display of radio 534 can operate as the mode indicator 132 of FIG. 1 showing the status of the system, that is, Normal, Restricted Access Valet Mode, etc., with icons indicating which units have their current path cut. Also, audible signals, such as a chirp that signals that a radio push button has been set to tune in a new radio frequency, can be used to indicate proper entry of numbers. In some embodiments the change in status can be announced by a digitized voice message played through a loudspeaker.

Part of the processing performed by the processing unit 116 is to compare the PIN entered via the buttons to a stored PIN as broadly indicated by 538 in FIG. 13. For extra security, the stored PIN and the button-entered PIN are encrypted. In this case, the user is able to retrieve the encrypted PIN, but not a decrypted version.

The PIN can be of variable length, preferably up to eight digits long. The PIN could be factory set and changeable by the user. For example, the number could be factory set to, say, "1111" or the factory could chose a PIN, register it in association with that particular radio or vehicle and then convey it to the motor vehicle owner in a sealed envelope with the vehicle's instruction manual. To change the number, the radio must be turned on, set to "Access Restriction" (via the "Band" switch), the "Scan" button pressed, e.g., once, and then the current value of the PIN entered.

Now a new number can be entered, followed by another depression of the "Scan" button. The system remains in the same state that it was in before the PIN was changed. This method of changing the PIN is given only by way of example, and it is clear that other ways of changing the number are contemplated and possible. If the processing unit 116 manipulates the PINS in encrypted form it must hold the system-specific encryption key with which to encrypt. This key should be in a protected portion of the processing unit so that it cannot be obtained.

The PIN is preferably encrypted using the Data Encryption Standard (DES). The particular key used for each vehicle can be stored by the manufacturer.

Since the typical radio has six radio station selector buttons, the PIN will generally use the digits 1 to 6. Using a four digit long PIN gives 1,296 different numbers from which to select, whereas five digits gives 7,776 possible PINs.

If a user forgets the PIN, the system can retrieve it.

The preferred method of retrieving an encrypted PIN is to read it out of the processing unit's storage and display it on the radio display. The user can then write it down and provide it to the manufacturer who would decrypt it with the vehicle's encryption key. By, e.g., keying in "0000", in the radio's Access Restriction state the system could be made to display the encrypted PIN.

Alternatively, a vehicle dealer could read out the encrypted PIN from the processing unit 116 by attaching an analyzer in the same way as is used to read out other stored vehicle data.

Information required by the Single-Key Security System, for example, the PIN, is stored in integrated circuit memory devices that retain the values even when power is cut off.

Of course the above procedure is only provided as an example and is not meant to limit the invention in any way.

As with the earlier embodiments, in order to prevent by-passing of the current path cutting features and applying electricity to the conductors leading to the locks, these conductors and the processing unit 116 are made as inaccessible as possible.

In case of a power failure, for example from a dead battery, the same system is used as for the earlier embodiments, except that radio 534 is designed so that when power is supplied by the secondary, preferably rechargeable, battery, in order to minimize current drain, only those circuits necessary to operate security system 530 are supplied with power.

Additionally, the radio can be designed to have a low-power-consumption audio power amplifier, not normally connected to a loudspeaker. When the primary battery fails, the high-power-consumption audio power amplifiers are automatically disconnected and the low-power-consumption audio power amplifier is automatically connected to a loudspeaker. This results in a low-power-consumption radio, which, in an emergency, could be kept turned on for a long time.

Thus, as shown in FIG. 13, radio 534 has two power connections to primary/secondary battery switch 128. When switch 128 cuts off primary battery 124, a relay coil in the radio connected to the primary power input is de-energized, switching the radio to the low-power consumption mode, with power supplied from the secondary power input.

Although described above with reference to the push buttons of a radio, other forms of data entry, including, but not limited to voice data entry, are also contemplated and covered by the present invention. For example, the radio (or another separate device) can be equipped with voice-input capabilities in order to receive spoken voice commands, and the processing unit can be programmed to receive and process these spoken commands using voice-recognition techniques. In this way, for example, a vehicle driver can simply say out loud the word "Restricted Mode" in order to enter the vehicle's Restricted Access Valet Mode. Since voicing the PIN aloud is potentially insecure, the system can be trained to recognize a particular voice (or voices) and to respond only to those voices. Alternatively, voice-recognition can be used in conjunction with the button entry of the PIN to achieve greater security. Thus, the system will only respond to a recognized voice saying, for instance, "Exit Restricted Mode" or "Normal Mode". Using voice-recognition alone obviates the need for encryption, although training of the system (to recognize a particular voice) may require entry of a PIN or of some other form of user identification.

Alternatively, the remote control, voice-recognition and push-button capabilities of the system can be combined, e.g. with the remote control placing the vehicle in the Restricted Access Valet Mode and the other capabilities of the system returning it to the Normal Mode.

An additional feature can be incorporated into this system to make its use more convenient and less forget-prone. When the ignition key is turned to its extreme counter-clockwise, key withdrawal position, or when the key is withdrawn, and when it is inserted into the ignition lock, the radio is turned on automatically, if it was off, placed in the Access Restriction Mode and for, say, twenty seconds, on the instrument panel, the word "Normal Mode" is flashed, say, in green if the system is in the Normal Mode, and, if it is in the Restricted Access Valet or Extra Security Mode, those words are flashed, in red, with icons showing the units that are inaccessible lit up. During this twenty second period, the mode can be changed and if in or changed to the Restricted Access Valet/Extra Security Mode, individual units can be exempted from or re-included in the Restricted Access Valet/Extra Security Mode.

When the twenty second period expires, the radio returns to the state it was in prior to its beginning.

5. Secret Number Entry Via ID Tags a. Overview

The system shown in FIG. 13 can be modified so that the secret number is entered by inserting a machine-readable ID Tag into the Integrated Key/Remote Control. When an ID Tag is inserted into the receptor of an Integrated Key/Remote Control, it is read by a sensor, the information is transmitted to the motor vehicle's processor, and the system is placed in the Normal Mode. When the motor vehicle is turned over to a valet, the ID Tag is taken out of the Integrated Key/Remote Control and the Integrated Key/Remote Control is left with the valet. Withdrawing the ID Tag causes a signal to be sent, resulting in the motor vehicle's state to be changed to the Restricted Access Valet Mode. Apart from the feature of reading the ID number from the ID Tag and checking for a match with a stored ID number, the operation of this embodiment is the same as for single-key security systems with a remote control that is connector or key/key-ring operated.

A variety of machine-readable ID Tags can be used. Some of these will now be described.

b. Audio Plug Type ID Tag

Figure 14:
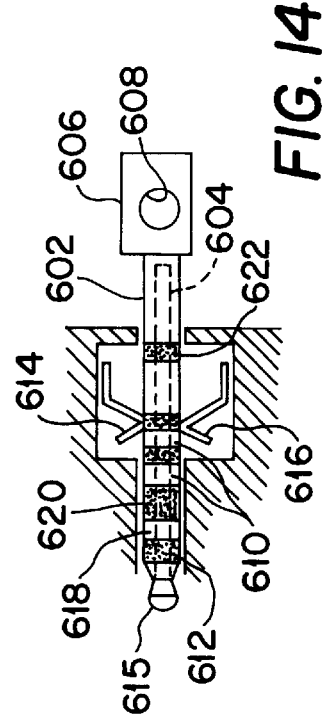

An audio plug type machine-readable ID Tag is shown in FIG. 14, inserted into the receptor of an Integrated Key/Remote Control. This ID Tag is in the form of a standard audio plug 602, three-thirty seconds or one-eighth inch in diameter. In the one-eighth inch diameter version, each bit position consists of a ring, one-eighth inch in diameter, one-sixteenth inch thick, made of either conductive material 610 (indicated in FIG. 14 with no shading) or insulating material 612, 620, 622 (indicated in FIG. 14 with dark shading), slipped onto a conductive shaft 604 with a grip 606. Grip 606 has a key ring hole 608 (for house keys, etc.) that is screwed on or otherwise attached. The bit rings combine to form the binary number which is specific to each vehicle.

If the ID Tag is one and one sixteenth inch long, providing seventeen bit positions, as shown in FIG. 14, 131,072 numbers can be represented. Alternatively, some of the bit positions could be used for speed sensing. For instance, with three bit positions assigned to speed sensing, the remaining fourteen can represent 16,384 numbers. With another three bits assigned to speed sensing, the remaining eleven bits can represent 2,048 numbers, which may be adequate.

The binary number is sensed by a pair of spring electrodes 614, 616. These spring electrodes are set up in such a way as to form a closed circuit when a conductive ring 618 (i.e. a ring made of conductive material) passes, and to form an open circuit when an insulating ring 620 (i.e. a ring made of insulating material) passes.

To conserve power, the sensing circuitry is turned on only while sensing takes place. The first time sensing electrodes 614, 616 are connected, by the tip 615 of the ID Tag, the sensing circuitry is turned on. After having read all bit positions, the sensing circuitry is turned off, with the spring electrodes coming to rest on end insulated ring 622 of the ID Tag.

When the ID Tag is pulled out of the receptor, putting the system into the Restricted Access Valet Mode, spring electrodes 614, 616 will be connected several times, but only the first connection will cause a signal to be sent to the motor vehicle.

c. Flat ID Tags
i. Overview

A flat, machine-readable type of ID Tag can also be used with the present invention. A wide variety of such tags can be devised using different technologies. For instance, they can be made of plastic, say, up to one-eighth inch thick, half an inch to one-and-a-half inches wide, and two to three inches long. Where possible, an ID Tag would be readable with one or the other side up, either by replicating the machine-readable information on each side, or by having the machine-readable information layer laminated in the center.

Sensing circuitry power is turned on only during sensing of the ID Tag, e.g., by having the ID Tag cause a first electrode in the Integrated Key/Remote Control receptor pushed against a second electrode by either the ID Tag's side edge or its flat surface and relieving the pressure at the end of sensing by having the first electrode move into a notch in the side of the ID Tag or a hole through it.

As with the other embodiments of the present invention, there is a brief period during which the Restricted Access Valet Mode can be customized and the current paths to individual units re-enabled after the system has been changed to the Restricted Access Valet Mode.

Also, although not specifically described, where possible, provisions are made for an Extra Security Mode.

ii. Bar Code ID Tags

Because of the low bit density required for the ID Tags of the present invention, almost any bar code can be used, with the bars at right angles to the direction of travel of the ID Tag.

A stationary light or IR emitter and detector can be used, with either both, or the emitter or the detector focused on, or at least close to, the bar code carrying layer.

For higher bit densities, the moving sensor design for the Magnetic Stripe ID Tag described below, or multiple, parallel bar code tracks with individual, stationary detectors and, possibly, one light emitter, can be used.

iii. Hole Code ID Tags

Similar in operation to Bar Code ID Tags, Hole Code ID Tags can also be used with the present invention. The Hole Code ID Tag differs from the Bar Code ID Tag in that light is shone on one side of an opaque ID Tag with holes, and a detector on the other side.

iv. Telephone-Type ID Tags

Examples of telephone-type ID Tags are shown in FIG. 15 and 16. These telephone-type ID Tags are logically similar to the audio plug design shown in FIG. 14, except that the telephone-type ID Tags use telephone technology with several parallel data channels.

The telephone-type ID Tags of the present invention are based on the connectors used in U.S. telephones and, specifically, on the devices which keep handset cords tangle free (e.g., Radio Shack Catalog No. 279-333UN), where a small rotatable drum, divided into circumferential channels, with a wire, like those used in the standard telephone connector, in each channel, has contact made to each wire by a wire electrode. The only basic technical difference between conventional telephone contact systems and the ID Tag 630 of FIG. 15 is that in ID Tag 630, selected parts of the wires 632, 634 and 636 are covered with an insulation, for instance, part 648 (as indicated by the shaded coloring). It is the positioning of these insulators which signifies the binary information specific to each ID Tag.

Wires 632, 634, 636 and 638 are embedded in parallel channels along the ID Tag's longitudinal axis. Wire 638 is bare, i.e. has no insulators. It forms a right angle 660 which connects wire 638 to wires 632, 634 and 636.

The Integrated Key/Remote Control that is used with these telephone-type ID Tags has spring electrodes 640, 642 and 644 arranged in receptor 650 in such a way as to contact wires 632, 634 and 636 in order to sense the binary information as the ID Tags is moved.

Current is supplied to the coded wires of ID Tag 630 by spring electrode 646 in receptor 650, which contacts wire 638.

In one possible manufacturing method, the wire-containing channels would be contoured, so that at the end of every bit position, one eighths of an inch long in FIG. 15, there would be a divider which, given the elasticity of plastic, would allow a wire to be pressed all the way down and locked. The upper part of the divider would similarly allow an insulator to be pressed in and locked. Similarly, the right-angle piece 660 of current supply wire 638 would be pressed into suitably shaped openings of the channels.

The process of manufacturing telephone-type ID Tags could be automated, with a machine cutting the wires, inserting them into the ID Tag channel by channel, then, under program control, inserting the insulators into the channels on top of the wires to create the desired binary sequences.

When outside the receptor, the wires of ID Tag 630, as shown in FIG. 15, are exposed to possible contamination by dirt, etc., which could affect the reliability of its operation. FIG. 16 shows a design which minimizes the wires' exposure to contaminants by encasing them in a sliding cover 662, which is automatically removed as the ID Tag 664 is pushed into the receptor 666 and put back in place when ID Tag 664 is pulled out.

The operation, which results in a reading of the ID Tag's binary information, is as follows: When ID Tag 664 is pushed into receptor 666, cover 662 is restrained by walls 668 from going any further into receptor 666. Cover 662 is locked into place by receptor springs 670, 672. At the same time, as ID Tag 664 is being pushed into receptor 666, the portion of the tag containing the binary information slips out of cover locks 674, 676 by bending the elastic side walls of cover 662. When ID Tag 664 is being pulled out of receptor 666, receptor springs 670, 672 prevent cover 662 from moving until cover lock 674, 676 notch indentations in ID Tag 664 slip over the hooks of cover 662, locking tag and cover together, so that, as the ID Tag is pulled further, the cover slips out of springs 670, 672.

v. Magnetic Stripe ID Tags

Figure 17A:
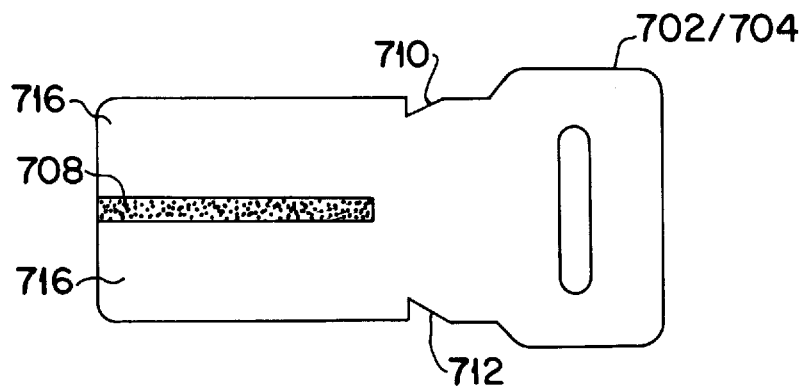
Figure 17B:
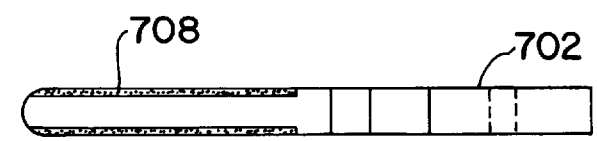
Figure 17C:
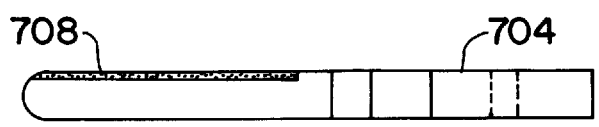

The Integrated Key/Remote Control embodiment of the present invention can also be used with magnetic stripe ID Tags, examples of which are shown in FIGS. 17A, 17B, 17C. Because of the low bit density recording required to represent the vehicle's ID, a magnetic stripe ID Tag reader could be constructed similar to the bar code designs with a stationary, spring loaded read head.

Since, unlike the signals generated by the readers of the preceding ID Tags, a signal from a magnetic stripe reader is speed dependent and since there are applications where higher bit densities are desirable, a design which is not dependent on hand-controlled speed will be described.

First, to facilitate understanding the detailed description, the basic principles of operation will be presented.

To eliminate the unreliability caused by moving a magnetic stripe tag or card past a stationary magnetic head by hand, hand motion is used only to transfer energy into a compression spring. When the spring is released, it moves a magnetic head past a stationary magnetic stripe or a magnetic stripe past a stationary magnetic head. Since the speed of spring-caused motion can be high and can be predicted within fairly close limits, the electronic system can be designed accordingly, resulting in reliable operation.

It is also possible, instead of compression springs to employ other types of springs, such as tension springs or weights and cables and pulleys, in which to store energy, but such implementations will not be described.

The design is a multi-purpose design consisting of two types: a type which ejects the ID Tag after it has been read, or read and written on, and a type which holds the ID Tag after it has been read, or read and written on.

In the EJECT type, energy is stored in two springs that are compressed by hand when the ID Tag is pushed into the receptor. The HOLD type has only one spring.

In the EJECT type, the ID Tag is locked at its end-of-travel, such that the compressed spring exerting pressure on it cannot dislodge it. Also at the ID Tag's end-of-travel, the magnetic read/write (and erase prior to write) head (which is mounted in a magnetic head carrier) which has been pushed by the ID Tag, compressing a second spring, is raised up to the level of the ID Tag's surface, allowing its spring to propel the magnetic head over the magnetic stripe of the stationary ID Tag and, while moving over the magnetic stripe, read the information recorded on it. As the magnetic head ends its travel and comes to rest near the receptor entrance, it unlocks the mechanism holding the ID Tag in its end-of-travel position, thereby allowing the compressed spring exerting pressure on it to propel the ID Tag towards and almost out of the receptor entrance and, if the operation is READ-WRITE, writing on the ID Tag's magnetic stripe as it moves past the magnetic head. If the operation calls only for reading, the ID Tag, after it has been unlocked, is merely ejected.

In the HOLD type, which has only one spring, acting on the magnetic head, as the ID Tag reaches its end-of-travel position, it is locked so as to be extractable by hand, and the magnetic head is raised up to the level of the ID Tag's surface, allowing the spring to propel the magnetic head over the magnetic stripe of the stationary ID Tag and, while moving over the magnetic stripe, read the information recorded on it. The ID Tag can be either pulled out of the receptor, or pulled into an Extra Security Mode position.

The HOLD type is the type that would be used with a motor vehicle's Integrated Key/Remote Control.

Information read from the ID Tag of an Integrated/Key Remote Control would be transmitted to the motor vehicle's processor to determine if it matched stored information. If it did, the vehicle would be restored to the Normal Mode. Removal of the ID Tag from the receptor would generate a signal causing the vehicle to be placed in the Restricted Access Valet Mode. Latching the ID Tag into the Extra Security Mode position would cause generation of a signal associated with this mode.

If the HOLD type is of the READ followed by WRITE kind, there would be a different magnetic head configuration, with a read head followed by a write (and erase prior to write) head.

If there is a possibility for the ID Tag to be propelled completely out of the receptor, this could be prevented by having channels that pierce the ID Tag, with receptor springs that snap into them. There would be no friction as the ID Tag moves. When the ID Tag is ejected, it is stopped while it is still inside the receptor by the channel springs hitting the channel ends at the ID Tag's leading edge. Pulling the ID Tag by hand would overcome the spring resistance and allow the ID Tag to be removed.

FIG. 17A is a plan view showing an EJECT type ID Tag 702/704 with sharp-edged notches 710, 712. A HOLD type ID Tag has rounded notches in place of the sharp-edged notches to allow the tag to be pulled out by hand.

ID Tag 702, shown in vertical section in FIG. 17B, is for read-only operation. It has a magnetic a stripe 708 on each side of the tag to allow for insertion into the receptor with either side of the ID Tag up.

ID Tag 704, also shown in vertical section in FIG. 17C, is for write or read-write operations. In this embodiment, ID Tag 704 has a magnetic stripe 708 on only one side.

Areas 716 of ID Tags 702/704 are adapted to fit into guidance channels in the side of the Integrated Key/Remote Control receptor.

Figure 18:
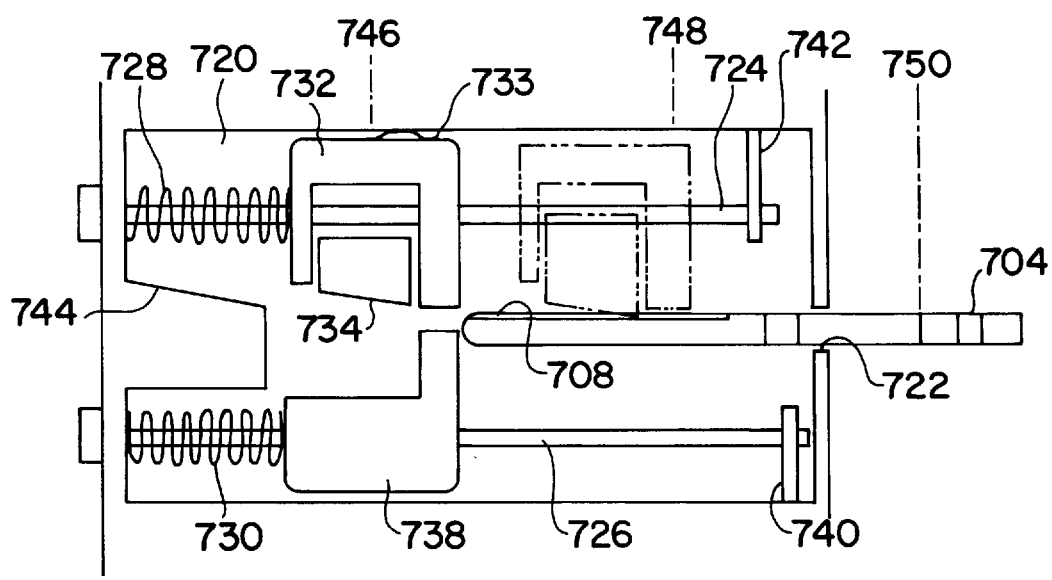

FIG. 18 shows how the system operates in the Read-and-Eject and Read-Write-and-Eject modes.

Magnetic stripe ID Tag Receptor-720 has ID Tag opening 722 which allows ID Tag 704 to pass into receptor 720. ID Tag 704 is inserted into opening 722 so that the magnetic stripe 708 faces upward.

Two stationary rods 724, 726, equidistant from both sides of receptor 720, span most of the length of the receptor and are parallel to the direction of motion of ID Tag 704 as it passes into receptor 720. The ends of rods 724, 726 which are farthest from opening 722, have springs 728, 730 coiled around them. The type of spring that could be used is the same or similar to that used in staplers, e.g., the spring in Swing Line stapler No. 78911, which can be compressed to a short length and has great throw and propulsion force.

Spring 728, coiled around rod 724, pushes against the magnetic head carrier housing 732. Carrier housing 732 is generally formed in the shape of an upside-down U, with two arms extending downwardly to rod 724 and a flat connecting arm parallel to rod 724. Rod 724 passes, without touching them, through the downward extending arms of carrier housing 732 in such a way that spring 728 pushes against carrier housing 732. Magnetic erase/read-write head carrier 734 is contained in carrier housing 732. The magnetic head inside carrier 734 has a semi-cylindrical bottom to allow it to slide up to the magnetic stripe surface when it is raised and pushed. Magnetic head carrier 734 is also shaped like an upside-down U, but turned ninety degrees relative to housing 732. A slot in its top surface allows it to slide up under pressure of two springs (not shown), one on each side of rod 724, without colliding with rod 724. Signals from and to the magnetic head are passed from telephone-type wires in channels in the roof of the receptor via spring electrodes 733 to magnetic head carrier housing 732 and, by a similar sliding contact arrangement, from carrier housing 732 to magnetic head carrier 734.

Spring 730 coils around rod 726 at the end of rod 726 which is farthest away from opening 722. Spring 730 pushes against coupler 738. Coupler 738 has two portions, a horizontal portion which has rod 726 passing through it, without touching it, and a portion extending perpendicularly from the horizontal portion.

The end of rod 726 which is closest to opening 722 is held by coupler stop 740. The end of rod 724 which is closest to opening 722 is held by carrier housing stop 742.

Without an ID Tag in receptor 720, springs 728, 730 will press carrier housing 732 and coupler 738 against their respective stops 742, 740 near the ID Tag opening 722. Carrier stop 742 is positioned to the left of the coupler stop 740 to ensure that coupler 738 stops to the right of carrier 734.

When ID Tag 704 is pushed into ID Tag opening 722, the leading edge of ID Tag 704 pushes coupler 738, which, in turn, pushes carrier 734 and carrier housing 732. When carrier 734 reaches ramp 744, carrier 734, via the force exerted by the ramp, is moved up towards rod 724, above the top level of coupler 738. At this point, spring 728 now propels carrier housing 732 and its contents to the right and the Read/Write head reads the information on the ID Tag's magnetic stripe 708.

The ID Tag is locked into place at the end-of-travel of coupler 738 by springs in the receptor that have moved into its sharp notches 710, 712. These springs extend upwards into the guidance channels for carrier housing 732. Carrier housing 732 has fins 758 (as shown in FIG. 19B) sliding in these channels. At the instant reading of the ID Tag is completed, these fins will press out the springs sitting in ID Tag notches 710, 712, unlocking the ID Tag, allowing the coupler and ID Tag to be propelled by spring 730 to the right from its rest position, indicated in FIG. 18 by the dashed vertical lines 746: tip of the ID Tag 750: key ring hole end of the ID Tag. Also shown with dashed lines is the carrier housing moving to the right.

With magnetic head carrier 734 at rest, pressed against stop 742 by spring 728, the ID Tag, as it is being propelled to the right, is written on, following erasure, and ejected. Reading is from left to right, writing from right to left. If the operation is Read-and-Eject, writing is omitted.

Figure 19A:
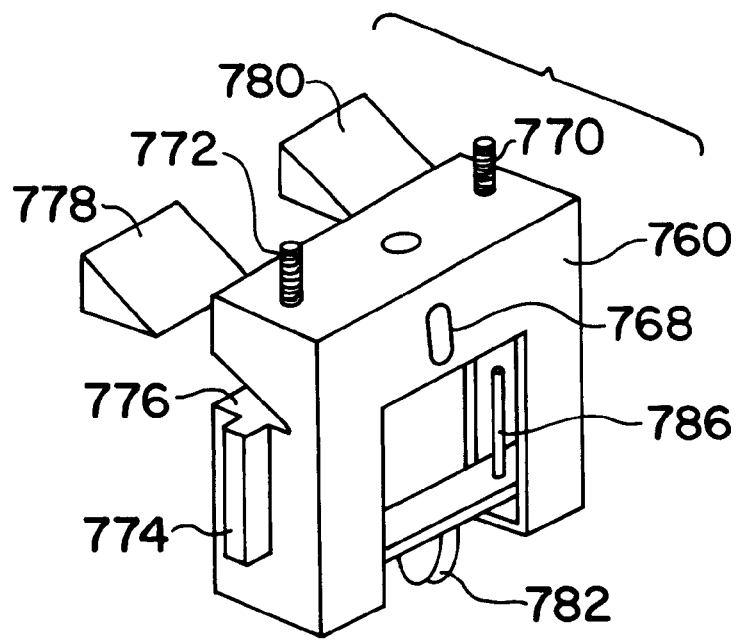
Figure 19B:
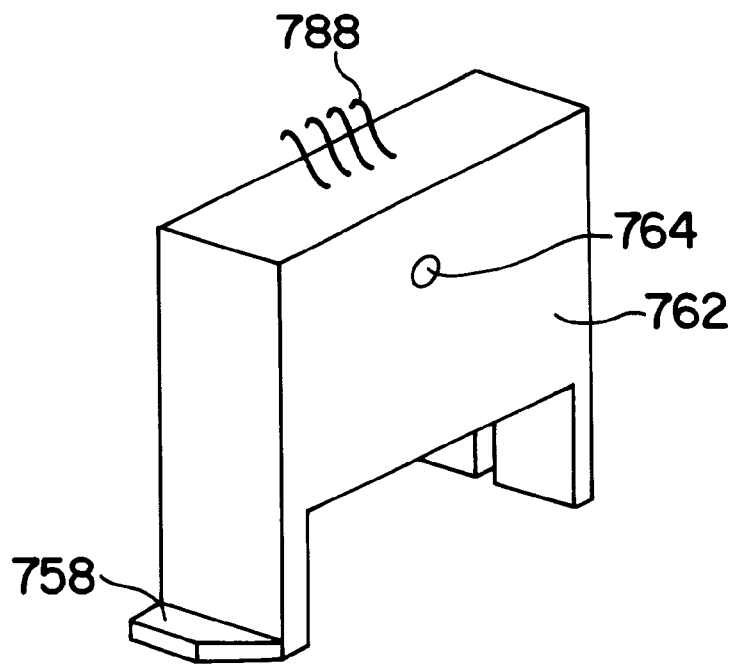

If the operation is Read-and-Hold or Read-Write-and-Hold, a design like that shown in FIGS. 19A and 19B would be used. This embodiment does not use a coupler and only a propulsion system for carrier 760 with a carrier housing 762. The carrier housing has a coil spring pressing against its back wall or the inside of its front wall to provide more room for the compressed spring (not visible in the drawings), hole 764 for a spring rod to pass through, and fins 758 fitting into guidance channels above the guidance channels for ID Tag 704.

Carrier 760 fits into carrier housing 762 so that vertically elongated carrier hole 768, larger in size if the coil spring extends to the inside of the housing front wall, matches up with carrier housing hole 764.

The carrier is generally formed in the shape of a rectangular box. Springs 770, 772 are attached to the top of the carrier, so that when the carrier is positioned in the carrier housing, the springs will exert pressure against the carrier. Slides 774 protrude on the sides of the carrier, shaped to fit into slots 790 in the walls of the carrier housing. Openings 776 are located in the walls of the carrier just above these fins. These openings are shaped to allow ramps 778, 780 to slide in and elevate the carrier pushed by the ID Tag against the spring pressure. The bottom of the carrier contains magnetic head assembly 782 attached to platform 784 under pressure from springs 786.

Signals are passed via spring electrodes 788 from and to the carrier/carrier housing to telephone-type wires in channels in the roof of the receptor.

Alternatively, platform 784 can be directly attached to a carrier 760 eliminating springs 786 (which may be necessary only if springs 770, 772 exert too much pressure on the magnetic stripe) and carrier 760 can be designed so that the ID Tag pushes against the magnetic head assembly 782 (with a suitable front "bumper") and carrier 760 does not ride on top of the ID Tag.

The implementation suitable for Single-Key Security Systems for Integrated Key/Remote Controls is the Read-and-Hold design version of FIGS. 19A and 19B.

Another design, differing from the preceding one in major ways is shown in FIGS. 20-24. It is an EJECT configuration, which is readily changed to a HOLD configuration. The main differences compared to the previously described design are:

Reading and writing from end-to-end, rather than over only part of the ID Tag;

Handling of notch-less ID Tags;

Better human factors during EJECT process;

Reduced height.

Since the basic operation is identical to that of the previously described designs, only differentiating features will be described.

The design of FIGS. 20–24 is for a unit that reads, or reads and writes, a magnetic stripe near an edge of the ID Tag. It is suitable for a variety of applications, including the reading of credit cards and the reading of and writing on mass transit passes and tickets.

Figures 20, 21:
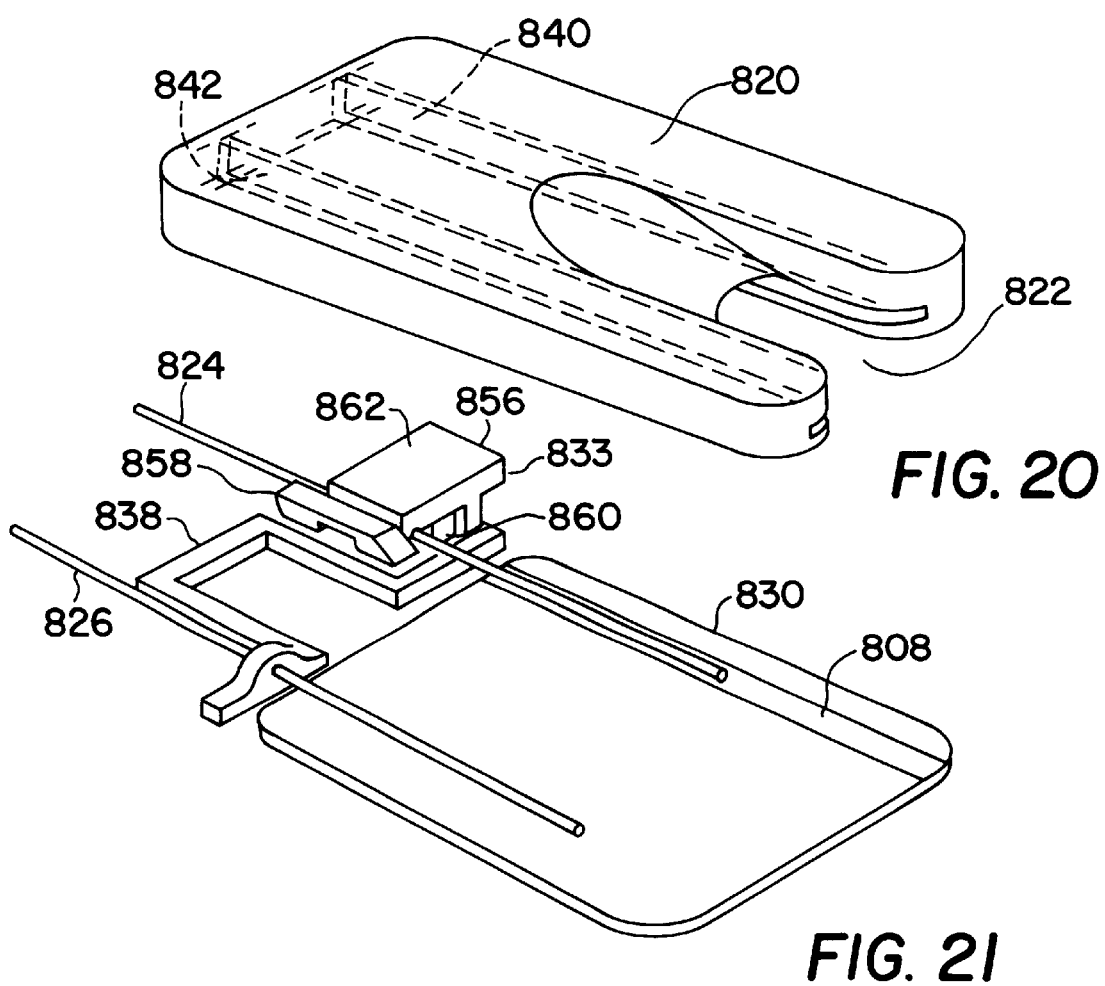
FIGS. 20, 21, 22, 23 and 24 illustrate further modifications of the invention.

FIG. 20 is a perspective view of the outside of the unit. There is a central, open "bay" to allow the ID Tag to be pushed into receptor 820 past the magnetic head carrier 860 in head housing 862, so that when carrier 860 and housing 862 are propelled towards receptor entrance 822, they will pass over the entire magnetic stripe. The receptor entrance 822 central slope permits an ID Tag to be pushed in further than would be possible without it.

Figure 22:
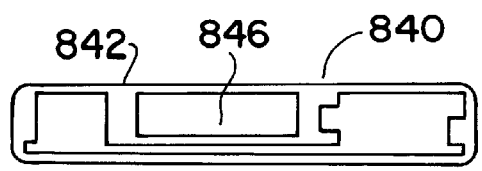
Figure 24:
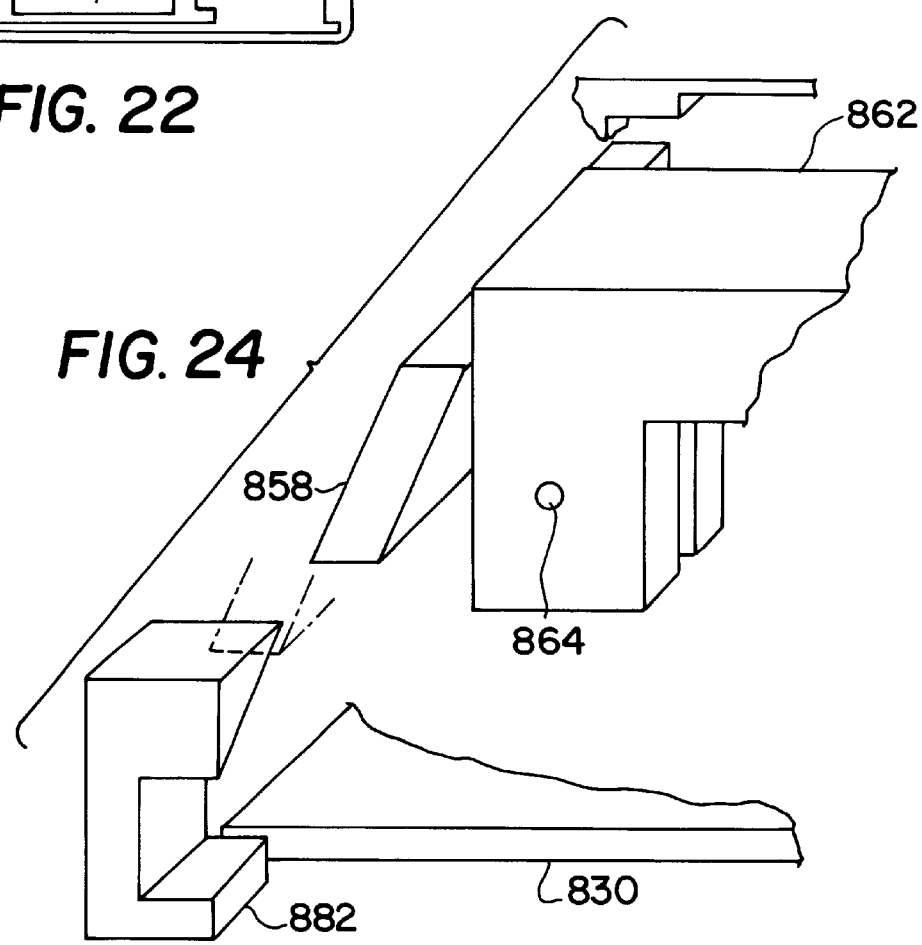
Figure 23:
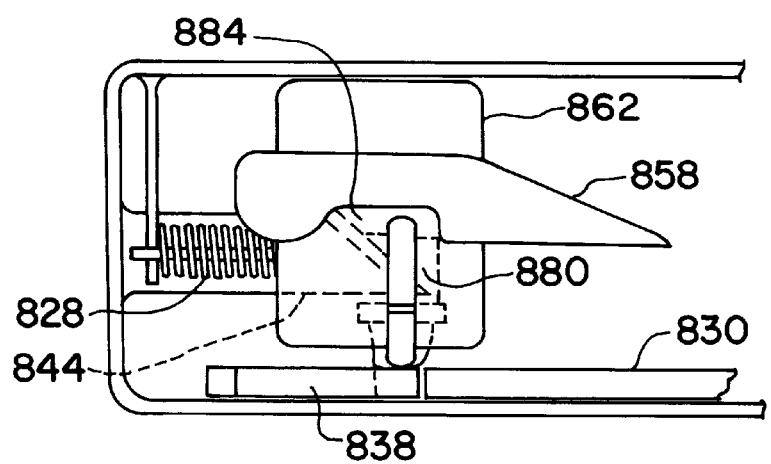

FIGS. 20 and 22 show two walls, 840 and 842. They support ceiling 846. Wall 840 has a channel for fin 858 of head housing 862 and also holds, in vertical shafts (not shown), ID Tag barrier 882 and head housing barriers 880, located near receptor entrance 822 and the receptor end wall, respectively. Fin 856 of head housing 862, which rides in a channel in the receptor shell wall with telephone-type wires in grooves, has telephone-type spring electrodes that contact the wires in the channel grooves, providing a wire-path to the moving magnetic head.

The solid support below the ID Tag, the tag channels in the receptor shell and the central ceiling make buckling of even thin ID Tags unlikely.

The layout of the main components is shown in FIG. 21. The differences compared to previously described designs are found in the coupler whose shape is dictated by the receptor entrance shape, and the functions of fins 856 and 858. Fin 856, in addition to stabilizing head housing 862, carries telephone-type electrodes 833, and fin 858 performs two instead of one additional function: as the head housing reaches its end of travel (see FIG. 23), after the head carrier 860 has been lifted by ramp 844, head housing barrier 880 is pushed upward by coupler 838, into head housing fin cavity 884 against the pressure of a leaf spring anchored in wall 842 (not shown), by coupler 838, allowing head housing 862 with head carrier 860 to move forward a small distance under the pressure of head housing spring 828. Head housing 862 with head carrier 860 stays in place until coupler 838, moving towards receptor entrance 822, pushed by the ID Tag spring (and, in turn, pushing the ID Tag and the user's hand) passes beyond head housing barrier 882, allowing it to descend. As head housing barrier 882 moves out of housing fin cavity 884, the ID Tag, which has moved a small distance towards the receptor entrance, comes to a halt, its motion stopped by ID Tag barrier 882. As the head housing reaches the end of travel near receptor entrance 822, head housing fin 858 lifts up ID Tag barrier 882 against the pressure of a leaf spring anchored in wall 842 (not shown) causing the ID Tag to be propelled towards receptor entrance 822.

In the preceding designs, the release of head housing 862 occurred automatically at the end of travel of the ID Tag, not under control of the user, whose hand had to be removed, preferably, at the end of ID Tag travel, which, however, was not exactly predictable. In the design shown in FIGS. 20–23, release of the ID Tag is under control of the user, who, after the ID Tag has reached its end of travel, allows it to move a small distance towards the receptor entrance until stopped by the ID Tag barrier. With the ID Tag momentarily stationary, the user's hand is then easily removed.

If the unit function is not EJECT, but HOLD, the ID Tag spring and associated parts of the receptor are omitted, as are head housing barrier 880 and ID Tag barrier 882. To hold the ID Tag at its end of travel and allow it to be pulled out by hand, one or two spring-like arms are installed at the back of the receptor shell so that they press down on the surface of the front part of the ID Tag, and the receptor entrance is shaped to allow the tag to be gripped when it is in the HOLD position.

The Read-Write-and-Eject design could be used by rental car companies: In addition to the Read-and-Hold receptor in the Integrated Key/Remote Control, a second receptor, of the Read-Write-and-Eject type, would be provided, e.g., built into the dashboard, using the same ID Tag as the Integrated Key/Remote Control.

When a customer returns a motor vehicle to the rental agency, the ID Tag is inserted into the dashboard slot. After reading the ID Tag's number and comparing it with the stored number, the information written, in an area different from that of the ID Tag number, could include:

Vehicle ID Number

Date

Time

Mileage

Miles Traveled

Fuel level

To keep the driver from cheating by inserting the ID Tag before returning the motor vehicle to the rental agency, the engine is disabled after writing and can only be re-enabled by a rental agency employee who inserts a universal ID Tag into the dashboard slot for reading.

Alternatively, if the motor vehicle has radio frequency reception facilities for its remote control, a transmitter at the rental agency building could send out a signal to re-enable the engine.

When the ID Tag is given, in the Integrated Key/Remote Control, to a rental car agency agent, it is inserted into the receptor of a Read-and-Eject type desk unit from where the information read is transferred to a computer.

With this arrangement, the vehicle renter need no longer write down mileage and fuel level, and the rental agency agent does not have to enter the data manually.

While the invention provides advantages and improvements over the dual-key valet systems, it is contemplated that the present invention can be used in conjunction with a dual-key system. It can also be used with the separate remote control, key systems described above.

While the invention has been described with respect to a motor vehicle, its use is not limited to such vehicles and it is contemplated that the single-key security system according to this invention will have other applications in other environments, including, but not limited to building security.

One skilled in the art will appreciate that the present invention can be practiced by other than the described embodiments, which are presented for purposes of illustration and not limitation, and the present invention is limited only by the claims that follow.

I claim:

1. A system for restricting access to certain components of a vehicle, the vehicle having a first mode wherein access to the certain components of the vehicle is restricted and a second mode wherein the certain components are accessible, the vehicle having a processor programmed to place the vehicle in the first mode upon receipt of a first signal and to place the vehicle in the second mode upon receipt of a second signal, the system comprising:

a remote control including a receptor and a device removably positioned within said receptor;

said remote control being operatively associated with said processor to cause transmission of the first signal to place the system in the first mode when said device is removed from said receptor.

2. A system according to claim 1 wherein said remote control also functions to cause transmission of the second signal to place the vehicle in the second mode when the device is positioned within said receptor.

3. The system according to claim 1, wherein the system is used in combination with a Vehicle Attack Alarm/Vehicle Theft Prevention system.

4. A system according to claim 1, wherein the device comprises a connector, removably connected to the remote control to cause transmission of said signals.

5. A system according to claim 1, wherein the device comprises a connector, removably connected to the remote control to cause transmission of said signals, and wherein the connector comprises an insulated portion and an electrically conductive portion causing a signal to be transmitted when the electrically conductive portion of the connector passes electrode means in the remote control.

6. A system according to claim 1, wherein the device comprises a connector, removably connected to the remote control to cause transmission of said signals, and wherein the insertion of the connector into the remote control brings together two electrodes, causing transmission of a signal.

7. A system according to claim 6, wherein the connector has a fin, the rotation of the connector in the receptor of the remote control causing the fin to push two electrodes together.

8. A system according to claim 6, wherein the insertion of the connector into the remote control causes a spring-loaded slider block to be moved at right angles to the direction of travel of the connector, causing momentary contact to be made between a metal area on a surface of the slider and two separated spring electrodes, momentarily causing transmission of a signal.

9. A system according to claim 1, wherein the device comprises a connector, removably connected to the remote control to cause transmission of said signals, and wherein the remote control comprises:

a movable magnet, positioned on a magnet carrier, movable upon the insertion of the connector into the remote control; and a stationary magnet, attached to a spring electrode, positioned in an area of the remote control such that when the connector is inserted into the remote control, the movable magnet moves into a position parallel to the stationary magnet, causing the two magnets to attract one another, forcing the spring electrode to come into contact with another spring electrode, causing transmission of a signal.

10. A system according to claim 1, wherein the device comprises a connector, removably connected to the remote control to cause transmission of said signals, and wherein a part of a surface on the connector is made of a conducting material, the insertion of the connector into the remote control causing the conductive material to momentarily connect two spring electrodes, causing transmission of a signal.

11. A system according to claim 1, wherein the remote control comprises:

a ring with a gap;

said receptor in the remote control adapted to fit the ring; and a push button on the remote control, the depressing of the button allowing the ring to be rotated and pushing together two spring electrodes causing transmission of a signal.

12. A system according to claim 1, wherein the remote control comprises:

a ring with a gap; said ring being rotatable and means operatively associated with said gap to cause transmission of said signals when said ring is rotated.

13. A system according to claim 1, wherein the remote control mechanism is comprised of:

a key or a key ring;

the receptor in the remote control adapted to fit the key or key ring; and a movable slider, blocking the receptor when the key or key ring has not been inserted into the remote control, the insertion of the key or key ring into the receptor pushing the slider aside, causing momentary contact to be made between two spring electrodes, causing transmission of a signal.

14. A system according to claim 1, wherein the remote control mechanism is comprised of:

a key or a key ring;

the receptor in the remote control adapted to fit the key or key ring, the receptor comprising one or more hinged, spring-loaded jaws, the insertion of the key or key ring causing a jaw to rotate and momentarily force two spring electrodes together, causing transmission of a signal.

15. A system according to claim 1 wherein the remote control comprises two physically separable parts, one part being a Key Remote Control integrated with the key to be given to a valet, and the second part comprising a Driver Remote Control for retention by the owner of a motor vehicle, the connection and separation of the two parts causing transmission of a signal.

16. A system according to claim 15 including face-to-face infrared emitters and receivers at the interfaces of the Key and Driver Remote Controls to transmit signals and power.

17. A system according to claim 1 wherein the processor is adapted to receive the second signal from a radio in the motor vehicle, the radio being modified to include mode controls to put the vehicle in the second mode by the entering of a secret number.

18. A system according to claim 1 wherein the remote control includes a system specific ID tag removably connected to the remote control whereby removal of the ID tag causes transmission of one signal and its connection to the remote control causes transmission of the other signal.

19. A system according to claim 18 wherein the tag comprises an audio plug having system specific binary information encoded thereon.

20. A system according to claim 18 wherein the tag comprises a flat machine readable ID tag with system specific binary information encoded on the tag.

21. A system according to claim 18 wherein the tag comprises a bar code with encoded system specific binary information.

22. A system according to claim 18 wherein the tag comprises a hole code ID with encoded system specific binary information.

23. A system according to claim 18 wherein the tag comprises conductive and non-conductive areas representing system specific binary information.

24. A system according to claim 18 wherein the tag comprises a magnetic stripe ID tag with system specific binary information encoded thereon.

25. A system for restricting access to said components of a vehicle, the vehicle having a first mode wherein access to the said components of the vehicle is restricted and a second mode wherein the certain components are accessible, the vehicle having a processor programmed to place the vehicle in the first mode upon receipt of a first signal and to place the vehicle in the second mode upon receipt of a second signal, the first signal being sent to the processor when the connector is withdrawn from the vehicle's remote control and the second signal being sent to the processor from the motor vehicle's radio, the radio being modified to include mode controls to put the vehicle in the second mode by the entering of a secret number including means to automatically change the radio from a normal power consumption mode to a lower power consumption mode upon failure of the normal power source thereby enabling a switch over to a lower capacity, secondary power source.

26. A system comprising a vehicle and an in-vehicle processor capable of operating in several modes, and means for switching operation of said processor from one mode to another, said means including signals received from a remote control incorporating a receptor and a control device removably held by said receptor, and means whereby removal of said device from said receptor causes transmission of a signal to the in-vehicle processor to switch from one mode to another.

* * * * *